United States Patent
Fiscus et al.

(10) Patent No.: US 11,248,113 B2
(45) Date of Patent: Feb. 15, 2022

(54) CYCLIC OLEFIN COPOLYMERS AND FILMS PREPARED THEREFROM

(71) Applicant: ExxonMobil Chemical Patents Inc., Baytown, TX (US)

(72) Inventors: David M. Fiscus, Houston, TX (US); Peijun Jiang, Katy, TX (US); Yong Yang, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 131 days.

(21) Appl. No.: 16/692,804

(22) Filed: Nov. 22, 2019

(65) Prior Publication Data
US 2020/0172645 A1 Jun. 4, 2020

Related U.S. Application Data

(60) Provisional application No. 62/773,514, filed on Nov. 30, 2018.

(51) Int. Cl.
*C08F 232/00* (2006.01)
*C08F 232/02* (2006.01)
(Continued)

(52) U.S. Cl.
CPC ........ *C08L 23/0823* (2013.01); *C08F 210/02* (2013.01); *C08F 232/08* (2013.01);
(Continued)

(58) Field of Classification Search
CPC .... C08F 232/02; C08F 232/04; C08F 232/06; C08F 232/08; C08F 2500/11; C08L 45/00; C08L 45/022; C08L 2203/06; C08L 45/02
See application file for complete search history.

(56) References Cited

U.S. PATENT DOCUMENTS 3,385,840 A * 5/1968 Natta ................... C08F 4/42
526/169.2
3,453,250 A * 7/1969 Sartori ............... C08F 210/00
526/79

(Continued)

FOREIGN PATENT DOCUMENTS

CN 104527189 8/2016 ............. B29C 55/06
GB 1294922 11/1972 ............. C08F 15/04

(Continued)

OTHER PUBLICATIONS

Hong, M. et al. (2012) "Synthesis of Novel Cyclic Olefin Copolymer (COC) with High Performance via Effective Copolymerization of Ethylene with Bulky Cyclic Olefin," *Macromolecules*, v.45(13), pp. 5397-5402.

*Primary Examiner* — Rip A Lee

(57) ABSTRACT

The present disclosure provides copolymers comprising from about 0.5 wt % to about 25 wt % cyclic olefin content and films comprising the copolymers. In one embodiment, a copolymer includes a $C_2$-$C_{40}$ monomer content of from about 75 wt % to about 99.5 wt %; and a $C_5$-$C_{40}$ cyclic olefin comonomer content of from about 0.5 wt % to about 25 wt %. The copolymer has a density of about 0.91 g/cm$^3$ to about 0.933 g/cm$^3$. Films of the present disclosure can have advantageous mechanical properties (such as melt strength) and optical properties (such as haze %).

24 Claims, 4 Drawing Sheets

(51) Int. Cl.
*C08F 232/08* (2006.01)
*C08L 45/00* (2006.01)
*C08F 210/02* (2006.01)
*C08L 23/08* (2006.01)
*C08J 5/18* (2006.01)
*C08F 232/06* (2006.01)
*C08F 232/04* (2006.01)

(52) U.S. Cl.
CPC ............. *C08J 5/18* (2013.01); *C08L 23/0815* (2013.01); *C08F 232/04* (2013.01); *C08F 232/06* (2013.01); *C08F 2500/11* (2013.01); *C08J 2323/08* (2013.01); *C08J 2345/00* (2013.01); *C08J 2423/08* (2013.01); *C08L 45/00* (2013.01); *C08L 2203/16* (2013.01); *C08L 2205/025* (2013.01); *C08L 2205/03* (2013.01); *C08L 2205/12* (2013.01)

(56) References Cited

U.S. PATENT DOCUMENTS

| | | | | |
|---|---|---|---|---|
| 3,467,631 | A * | 9/1969 | Sartori | C08F 210/00 525/331.8 |
| 3,525,720 | A * | 8/1970 | Prucnal | B05D 7/16 525/120 |
| 4,153,171 | A | 5/1979 | Kersting et al. | 215/12 |
| 4,874,808 | A * | 10/1989 | Minami | G11B 7/2538 524/291 |
| 4,968,747 | A | 11/1990 | Mallikarjun | 525/74 |
| 5,179,171 | A * | 1/1993 | Minami | C08F 210/02 525/288 |
| 5,324,801 | A * | 6/1994 | Brekner | C07F 17/00 526/160 |
| 5,352,739 | A | 10/1994 | Arjunan | 525/75 |
| 5,635,573 | A * | 6/1997 | Harrington | C08F 232/00 526/170 |
| 5,654,386 | A * | 8/1997 | Minami | C08F 210/02 526/281 |
| 5,756,623 | A * | 5/1998 | Kreuder | C08F 232/00 526/308 |
| 5,837,787 | A * | 11/1998 | Harrington | C08F 210/02 526/160 |
| 5,942,587 | A * | 8/1999 | Arjunan | C08F 210/02 526/281 |
| 6,111,019 | A | 8/2000 | Arjunan et al. | 525/211 |
| 6,121,383 | A | 9/2000 | Abdou-Sabet et al. | 525/192 |
| 6,140,441 | A * | 10/2000 | Hakuta | C08F 210/18 526/348 |
| 6,191,243 | B1 * | 2/2001 | Nitta | C08F 232/00 526/134 |
| 6,232,407 | B1 * | 5/2001 | Hashidzume | C08F 8/04 525/331.7 |
| 6,255,248 | B1 * | 7/2001 | Bansleben | A23L 3/263 252/188.28 |
| 6,313,241 | B1 * | 11/2001 | Gauthier | B32B 27/32 526/160 |
| 6,528,670 | B1 | 3/2003 | Rix | 556/11 |
| 6,538,070 | B1 * | 3/2003 | Cardwell | C08F 10/00 525/240 |
| 6,559,253 | B2 | 5/2003 | Crowther et al. | 526/160 |
| 6,627,714 | B2 * | 9/2003 | Yamamoto | C08F 210/02 502/152 |
| 7,052,750 | B2 | 5/2006 | Niepelt | 428/35.7 |
| 7,271,277 | B2 * | 9/2007 | Park | C07C 45/58 502/103 |
| 7,285,609 | B2 * | 10/2007 | Baugh | C07F 15/04 502/155 |
| 7,700,692 | B2 | 4/2010 | Dean | 525/191 |
| 7,829,633 | B2 † | 11/2010 | Heukelbach | |
| 8,329,276 | B2 | 12/2012 | Cruz | 428/40.1 |
| 8,426,529 | B2 * | 4/2013 | Baugh | C08F 210/02 525/332.1 |
| 8,916,662 | B2 * | 12/2014 | Lee | C07F 7/28 526/161 |
| 8,945,702 | B2 | 2/2015 | Wuest et al. | 428/200 |
| 9,193,856 | B2 * | 11/2015 | Ebata | C08J 9/04 |
| 9,315,605 | B2 * | 4/2016 | Lee | C08F 10/00 |
| 9,650,460 | B2 * | 5/2017 | Park | C08F 4/65908 |
| 9,982,081 | B2 * | 5/2018 | Yang | C08L 45/00 |
| 10,335,308 | B2 | 7/2019 | Pham et al. | B32B 7/02 |
| 10,723,871 | B2 * | 7/2020 | Han | C08L 23/16 |
| 10,730,978 | B2 * | 8/2020 | Yang | C08F 210/18 |
| 2002/0160135 | A1 | 10/2002 | Christopherson et al. | 428/35.7 |
| 2003/0130452 | A1 * | 7/2003 | Johnson | C08F 10/00 526/172 |
| 2003/0179460 | A1 * | 9/2003 | Kuroda | G02B 1/04 359/642 |
| 2005/0112337 | A1 | 5/2005 | Jester | 428/200 |
| 2005/0186373 | A1 | 8/2005 | Rhee et al. | 428/35.7 |
| 2005/0203261 | A1 * | 9/2005 | Sukhadia | C08F 4/44 526/160 |
| 2005/0244665 | A1 | 11/2005 | Rivett et al. | 428/500 |
| 2007/0110853 | A1 | 5/2007 | Bekele | 426/106 |
| 2008/0033112 | A1 | 2/2008 | Squire et al. | 525/240 |
| 2008/0071046 | A1 | 3/2008 | Leclerc et al. | 526/126 |
| 2008/0221275 | A1 * | 9/2008 | Baugh | C08F 8/04 525/332.1 |
| 2009/0208685 | A1 | 8/2009 | Rivers et al. | 428/36.91 |
| 2009/0234073 | A1 * | 9/2009 | Matsui | C09K 3/10 525/101 |
| 2009/0292088 | A1 * | 11/2009 | Oshima | C08F 232/08 526/131 |
| 2011/0054131 | A1 * | 3/2011 | Sung | C08F 210/02 526/189 |
| 2014/0363600 | A1 | 12/2014 | Dooley et al. | 428/36.91 |
| 2015/0018788 | A1 | 1/2015 | Pham et al. | 604/333 |
| 2016/0326353 | A1 | 11/2016 | Prades et al. | C08L 23/06 |
| 2017/0233516 | A1 * | 8/2017 | Yang | C08F 210/02 525/210 |
| 2018/0072878 | A1 | 3/2018 | Duan et al. | C08L 23/08 |
| 2018/0171048 | A1 | 6/2018 | Neuteboom et al. | C08F 210/02 |
| 2018/0223019 | A1 * | 8/2018 | Castaneda Zuniga | C08F 2/02 |
| 2018/0291128 | A1 * | 10/2018 | Yang | C08F 210/02 |
| 2018/0333938 | A1 | 11/2018 | Cheng et al. | B32B 27/08 |
| 2020/0239674 | A1 * | 7/2020 | Li Pi Shan | C08K 3/22 |

FOREIGN PATENT DOCUMENTS

| | | | |
|---|---|---|---|
| JP | 2005/199514 | 7/2005 | ............ B29C 55/28 |
| JP | 2014/031218 | 2/2014 | ............ B65D 30/02 |
| JP | 2016/049775 | 4/2016 | ............ B32B 27/00 |
| JP | 2016/190449 | 11/2016 | ............ B32B 27/32 |

\* cited by examiner
† cited by third party

CYCLIC OLEFIN COPOLYMERS AND FILMS PREPARED THEREFROM

CROSS-REFERENCE TO RELATED APPLICATIONS

This application claims priority to and the benefit of U.S. Ser. No. 62/773,514, filed Nov. 30, 2018.

FIELD

The present disclosure provides copolymers comprising a cyclic olefin content and films comprising the copolymers.

BACKGROUND

Polyethylene (PE) and compositions containing polyethylene are useful in many applications, such as in films. The blown film technique, for example, is a useful way to manufacture PE films. One use of such films is in making bags, where the films can be formed as continuous cylinders then crimped to close one end. The process to blow polyethylenes into such films, however, involves a balance between processability (e.g., flowability and melt strength) of the polymer on the one hand and mechanical properties (e.g., tensile strength, modulus) of the polymer on the other. Improvements in both the polymer materials used to make such films, and the process itself, can synergistically make more blown films commercially attractive. However, optimum performance is often a matter of trading off one property against another. For example, linear, low density polyethylenes (LLDPE) resins, which represent a very large and important segment of the PE blown and cast film markets worldwide, yield good toughness and other advantageous and desirable properties. Nevertheless, these properties decrease as the modulus of the LLDPE increases since the modulus is proportional to the density for polyethylenes. Hence, the relatively low modulus of LLDPE restrains the down gauging potential of the films. Furthermore, LLDPE can be difficult to process at high rates, especially when run neat, due to insufficient melt strength.

LLDPE resins are synthesized by copolymerizing ethylene with an alpha-olefin comonomer such as 1-butene, 1-hexene or 1-octene. This copolymerization results in an ethylene-based copolymer with many short chain branches (SCB) along the polymer backbone. The incorporation of 1-butene, 1-hexene or 1-octene comonomers results in ethyl (2 carbons), butyl (4 carbons), or hexyl (6 carbons) branches, respectively, along the polymer backbone. Chain length of the short chain branches has effects on the end use properties and processability. The effects of branching on the properties of PE depend on the length and the amount of the branches. Short chain branches (SCB), of less than approximately 40 carbon atoms, interfere with the formation of crystal structures. Short branches mainly influence the mechanical, thermal and optical properties. It has been observed that differences in comonomer type have effects on the blown film properties. In general, film performance properties such as impact strength (toughness) and tear strength increase with an increase in the comonomer length. Blown film performance is also influenced by the comonomer composition distribution (CCD) (also often referred to as the short chain branch distribution (SCBD)) across the molecular weight distribution (MWD). LLDPE's have a high impact resistance but are difficult to process, thus LLDPE can benefit from the addition of longer-chain comonomers.

Many have been interested in modifying the architecture of such polyolefins in the hopes of obtaining new and better combinations of properties such as melt strength, stiffness, shrink and optical properties. Moreover, high optical clarity, great melt strength, bubble stability and good extrusion characteristics are critical for blown film, such as for heat sealable blown films. However, wide-ranging films made from ethylene-based copolymers still lack certain properties (e.g., great tensile and impact strength, puncture resistance, excellent optical properties and first-rate sealing properties). Improved strength properties, along with excellent drawability, would allow down gauging in blown film applications (e.g., as a bag).

More recently, cyclic olefin copolymers (COC), copolymers having ethylene and a cyclic olefin comonomer, has emerged as a microfluidic material, offering excellent moisture barrier, low water absorption, and exceptional resistance to chemicals, including organic solvents used in chemical analysis. These properties have made COC a great candidate for various applications, such as packaging, medical devices, optical lenses, drug delivery, and microfluidics. Typically used as a blend with other polymers, these cyclic olefin copolymers usually require high comonomer content (e.g., 35 wt % or greater) included in the copolymer, thus becoming a limiting factor for manufacturing, and compromising cost effectiveness and high throughput productivity. Furthermore, conventional COCs have poor optical properties.

Therefore, there is a need for new efficient and cost advantageous copolymers with improved processability of COCs without significantly impacting the mechanical properties and improving the optical properties of the blown film.

References for citing in an Information Disclosure Statement (37 C.F.R. 1.97(h)): U.S. Pat. Nos. 6,559,253; 6,528,670; Hong, M. et al. (2012) "Synthesis of Novel Cyclic Olefin Copolymer (COC) with High Performance via Effective Copolymerization of Ethylene with Bulky Cyclic Olefin," *Macromolecules*, v. 45(13), pp. 5397-5402; U.S. Pat. No. 5,942,587; JP 2016190449; JP 2016049775; CN 104527189; JP 2014031218; U.S. Pat. Nos. 8,945,702; 8,329,276; JP 2005199514; U.S. Pat. No. 7,052,750; JP 6271724; JP 5051501; Walcher, T. et al. (2008) "Peel Seals: Blends with Controllable Peel," *Kunststoffe*, 98(9), 77-81.

SUMMARY

The present disclosure provides copolymers comprising from about 0.5 wt % to about 25 wt % cyclic olefin content and films comprising the copolymers. In one embodiment, a copolymer includes a $C_2$-$C_{40}$ monomer content of from about 75 wt % to about 99.5 wt %; and a $C_5$-$C_{40}$ cyclic olefin comonomer content of from about 0.5 wt % to about 25 wt %. The copolymer has a density of about 0.91 g/cm³ to about 0.933 g/cm³. Films of the present disclosure can have advantageous mechanical properties (such as melt strength) and optical properties (such as haze %).

DETAILED DESCRIPTION

Figure 1A:
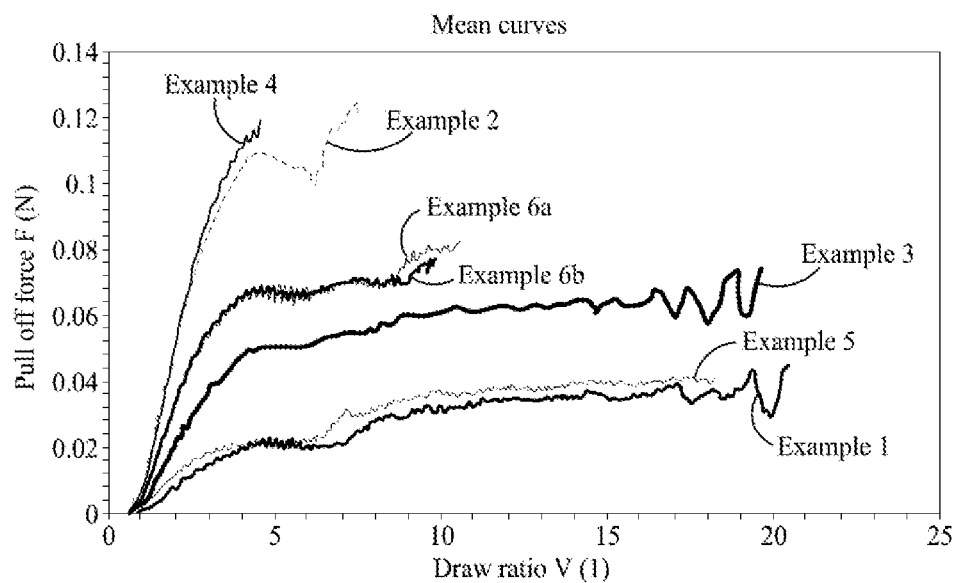
FIG. 1A is a graph illustrating extensional viscosity plot of pull-off force (melt strength) as a function of draw ratio of copolymers, according to one embodiment.

The present disclosure provides copolymers comprising from about 0.5 wt % to about 25 wt % cyclic olefin content and films comprising the copolymers. Films of the present disclosure have advantageous mechanical properties (such as melt strength) and optical properties (such as haze).

The present disclosure relates to copolymers, such as ethylene-norbornene copolymers, and methods for making copolymers and films therefrom. Copolymers can be synthesized using group 4 based catalyst(s), such as hafnium-based catalysts, and can include the product of one or more monomers, such as linear alpha-olefin monomers (e.g., ethylene), and a cyclic olefin content of from about 0.5 wt % to about 25 wt % based on the weight of the copolymer. A copolymer of the present disclosure can have one or more of: a melt index (ASTM 1238) (MI) from about 0.2 g/10 min to about 5 g/10 min; a high load melt index (HLMI) from about 1 g/10 min to about 130 g/10 min; a density of about 0.91 g/cm$^3$ to about 0.96 g/cm$^3$; a melt strength of about 1 cN or greater; an elongation stress Sigma Z of 0 MPa to 0.6 MPa; an ethylene content of about 80 wt % to about 99.5 wt %; a crystallization temperature "Tc" of about 75° C. to about 115° C., a melting temperature "$T_m$" of about 90° C. to about 125° C., and melt index ratio (MIR) value greater than 25.

In one aspect, films made from these cyclic olefin copolymers can demonstrate excellent physical properties such as excellent melt strength, tear performance, dart impact, stiffness, shrink and optical properties such as a % haze of from about 1% to about 25%. A film (e.g., blown film; shrink film) of the present disclosure can have one or more of: a melt index from about 0.05 g/10 min to about 2.5 g/10 min; a melt index ratio (MIR) of about 15 to 50; a cyclic olefin content of from about 0.5 wt % to about 25 wt %; a 1% Secant Modulus MD of 20,000 psi or greater and 1% Secant Modulus TD of 25,000 psi or greater; a Tensile Strength at Yield of about 1,500 psi to about 3,500 psi, an Elmendorf Tear (ASTM D1922) MD value of 15 g/mil to about 350 g/mil and an Elmendorf Tear TD value of 145 g/mil to about 1200 g/mil; a Dart Drop impact strength performance (Dart Impact) of about 75 g/mil to about 750 g/mil, such as about 75 g/mil to about 450 g/mil; a shrink MD of about 25% to about 75%, such as about 32% to about 52%, and a shrink TD of about −10% to about 99%, a haze (ASTM D1003) of about 25% or less, such as from about 1% to about 25%; an internal haze of about 1% to about 10%; a Gloss MD (ASTM D2457) of about 10 to about 30 and a Gloss TD (ASTM D2457) of about 10 to about 30. Furthermore, films of the present disclosure can have an excellent heat sealing and hot tack performance, for example with a hot tack strength of from 0 N/25.4 mm to 18 N/25.4 mm at a temperature of from 0° C. to 160° C. and a heat seal strength of from 0 lbs/in to 12 lbs/in at a seal bar temperature of from 100° C. to 160° C.

For purposes herein, the numbering scheme for the Periodic Table Groups is used as described in CHEMICAL AND ENGINEERING NEWS, 63(5), pg. 27 (1985). For example, a "group 4 metal" is an element from group 4 of the periodic table, e.g., Hf, Ti, or Zr.

The following abbreviations may be used herein: wt % is weight percent, mol % is mole percent, vol % is volume percent, Me is methyl, Ph is phenyl, Et is ethyl, Pr is propyl, iPr is isopropyl, n-Pr is normal propyl, Bu is butyl, tBu is tertiary butyl, Ph is phenyl, Bn is benzyl (i.e., $CH_2Ph$), MWD is molecular weight distribution, PDI is polydispersity index, MAO is methylalumoxane, THF (also referred to as thf) is tetrahydrofuran, RT is room temperature (and is 23° C. unless otherwise indicated), SLPM is standard liter per minute, tol is toluene, NB is norbornene, MD is machine direction, TD is transversal direction, psi is pounds per square inch, psig is pounds per square inch gauge, lbs is pounds, mil is millimeter, sec is second, min is minute, h is hour, J is Joule, EtOAc is ethyl acetate, Cy is cyclohexyl, Cp is cyclopentadienyl.

As used herein, an "olefin," alternatively referred to as "alkene," is a linear, branched, or cyclic compound of carbon and hydrogen having at least one double bond. For purposes of this specification, when a polymer or copolymer is referred to as including an olefin, comprising, but not limited to, ethylene, propylene, butene, cyclic olefin, the olefin present in such polymer or copolymer is the polymerized form of the olefin. For example, when a copolymer is said to have an "ethylene" content of 35 wt % to 55 wt %, it is understood that the monomer ("mer") unit in the copolymer is derived from ethylene in the polymerization reaction and said derived units are present at 35 wt % to 55 wt %, based upon the weight of the copolymer.

A "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers.

"Linear polymer" means that the polymer has few, if any, long chain branches and has a branching index ($g'_{vis}$) value of about 0.979 or above, such as about 0.98 or above. The branching index is determined by using a high temperature gel permeation chromatography equipped with three in-line detectors, a differential refractive index detector (DRI), a light scattering (LS) detector, and a viscometer (GPC-3D).

Unless otherwise indicated, as used herein, "low comonomer content" is defined as a polyolefin having less than 8 wt % of comonomer based upon the total weight of the polyolefin.

As used herein, "high comonomer content" is defined as a polyolefin having greater than or equal to 8 wt % of comonomer based upon the total weight of the polyolefin.

For purposes of this disclosure, ethylene shall be considered an α-olefin.

As used herein, a "catalyst" includes a single catalyst, or multiple catalysts with each catalyst being conformational isomers or configurational isomers. Conformational isomers include, for example, conformers and rotamers. Configurational isomers include, for example, stereoisomers.

As used herein, a "catalyst system" includes at least one catalyst compound and an activator and an optional co-activator. For the purposes of this disclosure, when a catalyst is described as including neutral stable forms of the components, it is well understood by one of ordinary skill in the art, that the ionic form of the component is the form that reacts with the monomers to produce polymers. Furthermore, catalysts of the present disclosure represented by a formula are intended to embrace ionic forms thereof of the compounds in addition to the neutral stable forms of the compounds. Furthermore, activators of the present disclosure are intended to embrace ionic and or reaction product forms thereof of the activator in addition to ionic or neutral form.

The term "complex," may also be referred to as catalyst precursor, precatalyst, catalyst, catalyst compound, transition metal compound, or transition metal complex. These words are used interchangeably. Activator and cocatalyst are also used interchangeably.

Unless otherwise indicated, the term "substituted" generally means that a hydrogen of the substituted species has been replaced with a different atom or group of atoms. For example, methyl-cyclopentadiene is cyclopentadiene that has been substituted with a methyl group. Likewise, picric acid can be described as phenol that has been substituted with three nitro groups, or, alternatively, as benzene that has been substituted with one hydroxy and three nitro groups.

An "anionic ligand" is a negatively charged ligand that donates one or more pairs of electrons to a metal ion. A "neutral donor ligand" is a neutrally charged ligand which donates one or more pairs of electrons to a metal ion.

A scavenger is a compound that can be added to a reactor to facilitate polymerization by scavenging impurities. Some scavengers may also act as chain transfer agents. Some scavengers may also act as activators and may be referred to as co-activators. A co-activator, that is not a scavenger, may also be used in conjunction with an activator in order to form an active catalyst. In at least one embodiment, a co-activator is pre-mixed with the transition metal compound to form an alkylated transition metal compound. Examples of scavengers may include, but are not limited to, trialkylaluminums, methylalumoxanes, modified methylalumoxanes, MMAO-3A (Akzo Nobel), bis(diisobutylaluminum)oxide (Akzo Nobel), tri(n-octyl)aluminum, triisobutylaluminum, and diisobutylaluminum hydride.

As used herein, "alkoxides" include those where the alkyl group is a $C_1$ to $C_{10}$ hydrocarbyl. The alkyl group may be straight chain, branched, or cyclic. The alkyl group may be saturated or unsaturated. In at least one embodiment, the alkyl group may include at least one aromatic group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" refers to $C_1$-$C_{100}$ radicals, that may be linear, branched, or cyclic, and when cyclic, aromatic or non-aromatic. Examples of such radicals include methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and their substituted analogues. Substituted hydrocarbyl radicals are radicals in which at least one hydrogen atom of the hydrocarbyl radical has been substituted with at least one halogen (such as Br, Cl, F or I) or at least one functional group such as $C(O)R^*$, $C(O)NR._2$, $C(O)OR.$, $NR._2$, $OR.$, $SeR.$, $TeR.$, $PR._2$, $AsR._2$, $SbR._2$, $SR.$, $BR._2$, $SiR._3$, $GeR._3$, $SnR._3$, and $PbR._3$ (where R. is independently a hydrogen or hydrocarbyl radical, and two or more R. may join together to form a substituted or unsubstituted saturated, partially unsaturated or aromatic cyclic or polycyclic ring structure), or where at least one heteroatom has been inserted within a hydrocarbyl ring.

The term "alkenyl" means a straight-chain, branched-chain, or cyclic hydrocarbon radical having one or more double bonds. These alkenyl radicals may be optionally substituted. Examples of suitable alkenyl radicals include ethenyl, propenyl, allyl, 1,4-butadienyl cyclopropenyl, cyclobutenyl, cyclopentenyl, cyclohexenyl, cyclooctenyl, including their substituted analogues.

The term "alkoxy" or "alkoxide" means an alkyl ether or aryl ether radical wherein the term alkyl is as defined above. Examples of suitable alkyl ether radicals include methoxy, ethoxy, n-propoxy, iso-propoxy, n-butoxy, iso-butoxy, sec-butoxy, tert-butoxy, and phenoxy.

The term "aryl" or "aryl group" includes a $C_4$-$C_{20}$ aromatic ring, such as a six carbon aromatic ring, and the substituted variants thereof, including phenyl, 2-methyl-phenyl, xylyl, 4-bromo-xylyl. Likewise heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, iso-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom-substituted ring where a hydrogen on a ring atom is replaced with a heteroatom. For example, tetrahydrofuran is a heterocyclic ring and 4-N,N-dimethylamino-phenyl is a heteroatom-substituted ring.

As used herein the term "aromatic" also refers to pseudo-aromatic heterocycles which are heterocyclic substituents that have similar properties and structures (nearly planar) to aromatic heterocyclic ligands, but are not by definition aromatic; likewise, the term aromatic also refers to substituted aromatics.

A "composition" of the present disclosure can include components (e.g., oil, polymer, etc.) and or reaction product(s) of two or more of the components.

As used herein, "mixing" refers to combining solid polyolefin such as cyclic olefin copolymer(s) and another reagent (e.g., additives, organic reagent, inorganic reagent, solvent, etc.), which may be solid. In at least one embodiment, a homogenizer is used for such mixing. "Homogenizers" are mechanical devices that combine two or more distinct materials, such as one or all in solid form, by physical methods such as mixing, spinning, agitation, vibration, or some combination thereof. Suitable homogenizers can be generally divided between horizontal conveyors, in which a screw or screw-like mechanism conveys polymer granules and or pellets and additive mixtures down the length of the homogenizer, and vertical or horizontal blenders which homogenizes polymer granules and or pellets and additive mixtures by agitation or some other non-conveying means. In at least one embodiment, the homogenizer maintains the materials being mixed in solid and or liquid form and does not create a molten material such as by heating a polymer to its melting point temperature.

As used herein, "melt strength" refers to the resistance of a polymer melt to stretching. Without being bound by theory, it is believed that the melt strength of a material is related to the molecular chain entanglements of the polymer and its resistance to untangling under strain. The polymer properties affecting the resistance to untangling are molecular weight, molecular-weight distribution (MWD) and molecular architectures. As used herein, "melt strength" refers to the force required to draw a molten polymer extrudate at an extrusion temperature of 190° C. until breakage of the extrudate whereby the force is applied by take up rollers. Melt index is determined herein using an extensional rheometer at 190° C., and the test is conducted by placing a 2 Kg weight at the top of a plunger for a simple capillary die. The mass of the resin that is "extruded" over 10 min is recorded. Melt Index (MI), for example, is indicative of a polymer's molecular weight and the Melt Index Ratio (MIR) is indicative of the molecular weight distribution. A polymer that exhibits a higher MI has a shorter polymer chain length. As MIR increases, the molecular weight distribution (MWD) of the polymer broadens. A polymer that exhibits a narrower molecular weight distribution has a lower MIR.

Hot Tack Initiation Temperature (HTIT) is the temperature at which seal strength is 1 N/25.4 mm. A Hot Tack test measures the temperature at which the film sticks to itself while the seal is still hot. Heat Seal Strength is the temperature as which the cooled seal undergoes a break type of failure.

The term "elongation stress Sigma Z" refers to a force per unit cross sectional area of the strand, which is taken from a Rheotens analysis, i.e., a viscosity measurement. The force is measured and the width of the strand is measured.

The term "continuous" means a system that operates without interruption or cessation. For example a continuous process to produce a polymer would be one where the reactants are continually introduced into one or more reactors and polymer product is continually withdrawn during a polymerization process.

A solution polymerization means a polymerization process in which the polymer is dissolved in a liquid polymerization medium, such as an inert solvent or monomer(s) or their blends. A solution polymerization can be homogeneous. A homogeneous polymerization is one where the polymer product is dissolved in the polymerization medium. Such systems are not turbid as described in J. Vladimir Oliveira, C. Dariva and J. C. Pinto, Ind. Eng. Chem. Res., 2000, Vol. 29, p. 4627.

A bulk polymerization means a polymerization process in which the monomers and or comonomers being polymerized are used as a solvent or diluent with little or no inert hydrocarbons as a solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as about 0 wt %.

"Conversion" is the amount of monomer that is converted to polymer product, and is calculated based on the polymer yield and the amount of monomer fed into the reactor.

Catalysts for Copolymer Formation

A cyclic olefin copolymer of the present disclosure can be formed by contacting ethylene and one or more $C_7$ to $C_{40}$ cyclic olefins with a catalyst system including an activator and at least one or more catalyst compound(s). Suitable catalysts are those capable of polymerizing a $C_2$ to $C_{20}$ olefin and incorporating cyclic olefins to form the ethylene copolymers. Suitable catalysts may include metallocene, post metallocene or other single site catalyst, and Ziegler-Natta catalysts. The term "post-metallocene catalyst", also known as "non-metallocene catalyst" describes transition metal complexes that do not feature any pi-coordinated cyclopentadienyl anion donors. Post-metallocene catalyst can be used for the polymerization of olefins when combined with common activators. See Baier, M. C.; Zuideveld, M. A.; Mecking, S. Angew. Chem. Int. Ed. 2014, 53, 2-25; Gibson, V. C., Spitzmesser, S. K. Chem. Rev. 2003, 103, 283-315; Britovsek, G. J. P., Gibson, V. C., Wass, D. F. Angew. Chem. Int. Ed. 1999, 38, 428-447; Diamond, G. M. et al. ACS Catal. 2011, 1, 887-900; Sakuma, A., Weiser, M. S., Fujita, T. Polymer J. 2007, 39:3, 193-207. See also U.S. Pat. Nos. 6,841,502, 7,256,296, 7,018,949, and 7,964,681.

A catalyst compound of the present disclosure can be a bridged biscyclopentadienyl transition metal compound comprising:
  i) at least one unsubstituted cyclopentadienyl ligand or aromatic fused-ring substituted cyclopentadienyl ligand;
  ii) one aromatic fused-ring substituted cyclopentadienyl ligand;
  iii) a transition metal bound to both cyclopentadienyl ligands; and
  iv) a bridge group connecting the two cyclopentadienyl ligands, said bridge having one or more carbon or silicon atoms.

Suitable catalysts can be, but are not limited to, those described in U.S. Pat. No. 6,528,670 B1. The bridged metallocene compounds can be bridged biscyclopentadienyl hafnium or zirconium compounds. These bridged biscyclopentadienyl hafnium or zirconium compounds of the present disclosure include those compounds having one substituted or unsubstituted carbon or substituted silicon atom bridging two cyclopentadienyl (Cp) ligands of the metal centers, the aromatic fused-ring substituted cyclopentadienyl ligand or ligands optionally containing substituents on the non-cyclopentadienyl aromatic rings selected from $C_1$-$C_{20}$ hydrocarbyl or hydrocarbylsilyl substituents. Substituents typically include one or more $C_1$ to $C_{30}$ hydrocarbon or hydrocarbylsilyl groups that can be linear, branched, cyclic, aliphatic, aromatic or combined groups, whether in a fused-ring or pendant configuration. Examples include methyl, isopropyl, n-propyl, n-butyl, isobutyl, tertiary butyl, neopentyl, phenyl, and benzyl. "Hydrocarbylsilyl" is exemplified by, but not limited to, $CH_2$—$SiR_3$, (where R. is $C_1$ to $C_{10}$ alkyl, such as methyl), trimethylsilyl and triethylsilyl. Similarly the use of heteroatom containing cyclopentadienyl rings or fused ring, where a non-carbon Group 14 or 15 atom replaces one of the ring carbons in the Cp ring or in a fused ring, is considered for this specification to be within the terms "cyclopentadienyl", "indenyl", and "fluorenyl".

Particularly useful bridged biscyclopentadienyl compounds can be represented by the formula:

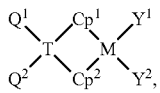

such as

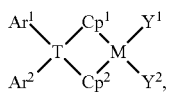

wherein:

M is zirconium or hafnium, such as hafnium;

each of $Cp^1$ and $Cp^2$ is independently a substituted or unsubstituted cyclopentadienyl-containing group;

T is a Group 14 element containing bridging group, such as comprising one or more carbon or silicon atoms;

each of $Y^1$ and $Y^2$ is independently an anionic leaving group;

each of $Q^1$ and $Q^2$ is independently a substituted or unsubstituted hydrocarbyl group; and each of $Ar^1$ and $Ar^2$ is independently a substituted or unsubstituted aryl group.

As illustrative non-limiting examples, $Ar^1$ and $Ar^2$ may be independently:

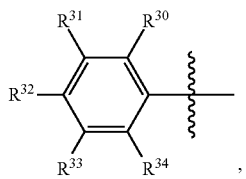

wherein each of $R^{30}$, $R^{31}$, $R^{32}$, $R^{33}$, and $R^{34}$ may be independently hydrogen, linear or branched hydrocarbyl, linear or branched substituted $C_1$-$C_{40}$ hydrocarbyl, silylcarbyl, substituted silylcarbyl, $C_6$-$C_{10}$ aryl, substituted $C_6$-$C_{10}$ aryl, —NR'$_2$, —SR', —OR', —OSiR'$_3$, —PR'$_2$, where each R' is hydrogen, halogen, $C_1$-$C_{10}$ alkyl, or phenyl.

As illustrative non-limiting examples, $Q^1$ and $Q^2$ may be independently hydrogen, linear or branched $C_1$-$C_{40}$ hydrocarbyl, linear or branched substituted $C_1$-$C_{40}$ hydrocarbyl, silylcarbyl, substituted silylcarbyl, $C_6$-$C_{10}$ aryl, substituted $C_6$-$C_{10}$ aryl, —NR'$_2$, —SR', —OR', —OSiR'$_3$, —PR'$_2$, where each R' is hydrogen, halogen, $C_1$-$C_{10}$ alkyl, or phenyl.

As illustrative, non-limiting examples, each of $Cp^1$ and $Cp^2$ may be independently unsubstituted cyclopentadienyl, substituted cyclopentadienyl, unsubstituted indenyl, substituted indenyl, unsubstituted fluorenyl, or substituted fluorenyl.

As illustrative non-limiting examples, $Y^1$ and $Y^2$ may be independently hydrogen, halide, hydroxyl, or $C_1$-$C_{50}$ substituted or unsubstituted hydrocarbyl, amide, alkoxide, sulfide, phosphide, halide, or a combination thereof, or $Y^1$ and $Y^2$ are joined together to form a metallocycle ring, or $Y^1$ and $Y^2$ are joined to form a chelating ligand, or an alkylidene, (such as each of $Y^1$ and $Y^2$ is independently a $C_1$ to $C_{12}$ alkyl (such as methyl, ethyl, propyl, butyl, pentyl, hexyl, octyl, nonyl, decyl, undecyl, dodecyl, or isomers thereof, such as iso-, tert-, n-, sec-), hydrido, benzyl, neopentyl, trimethylsilylmethyl, halogen (such as chloride, bromide, fluoride, iodide), triflate, such as methyl, chloride, or dialkylamido).

In at least one embodiment, T is a bridging group comprising Si, Ge, or C, such as T is dialkyl silicon or dialkyl germanium, such as T is dimethyl silicon.

In at least one embodiment, T is a bridging group and is represented by R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C=N—CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', or R'$_2$C—PR'—CR'$_2$, where each R' is, independently, hydrogen or a $C_1$ to $C_{20}$ containing hydrocarbyl, substituted hydrocarbyl, halocarbyl, substituted halocarbyl, silylcarbyl or germylcarbyl substituent, and optionally, two or more adjacent R' may join to form a substituted or unsubstituted, saturated, partially unsaturated or aromatic, cyclic or polycyclic substituent. For example, T is $CH_2$, $CH_2CH_2$, $C(CH_3)_2$, $SiMe_2$, $SiPh_2$, SiMePh, silylcyclobutyl ($Si(CH_2)_3$), $(Ph)_2C$, $(p$-$(Et)_3SiPh)_2C$, cyclopentasilylene ($Si(CH_2)_4$), or $Si(CH_2)_5$.

Specific bridged biscyclopentadienyl compounds include those derived from: (1) indenyl-based complexes such as the rac- or meso-isomer, or mixtures, of dimethylsilyl bis(indenyl)hafnium dimethyl, dimethylsilyl bis(2-methyl-indenyl)hafnium dimethyl, dimethylsilyl bis(2-propyl-indenyl)hafnium dimethyl, dimethylsilyl bis(4-methyl, 2-phenyl-indenyl)hafnium dimethyl, or methylene(indenyl)(2,7-di-tertbutyl-fluorenyl)hafnium dimethyl, and diphenylmethylene(indenyl)(2,7-bis tert-butylfluorenyl)hafnium dibenzyl; (2) fluorenyl-based complexes such as dibutylsilyl(fluorenyl)(cyclopentadienyl)hafnium dimethyl, dimethylsilyl(indenyl)(fluorenyl) hafnium dihydride, i-propyl (cyclopentadienyl)(fluorenyl)hafnium dimethyl, dinapthylmethylene(cyclopentadienyl)(fluorenyl)hafnium dimethyl, diphenylmethylene(2,7-ditertbutyl, 5-methyl-fluorenyl)(cyclopentadienyl)hafnium dimethyl, diphenylmethylene(2,7-dipara-n-butyl-fluorenyl)(cyclopentadienyl) hafnium dimethyl, diphenylmethylene (cyclopentadienyl)(2,7-dimethylfluorenyl)hafnium dimethyl, diphenylmethylene (cyclopentadienyl)(2,7-di-tertbutyl-fluorenyl)hafnium dimethyl, methylene (2,7-di-tertbutylfluorenyl)(fluorenyl)hafnium dimethyl, diphenylmethylene(2,7-di-tertbutylfluorenyl) (fluorenyl) hafnium dimethyl, methylene bis(fluorenyl) hafnium dimethyl, or methylphenylmethylene bis(fluorenyl) hafnium dimethyl; and (3) cyclopentadienyl-based complexes such as the rac- or meso-isomer, or mixtures of (para-trimethylsilylphenyl)(para-n-butylphenyl)methylene (fluorenyl)(cyclopentadienyl)hafnium dimethyl, di(para-trimethylsilylphenyl)methylene(2,7-di-tertbutylfluorenyl) (cyclopentadienyl)hafnium dimethyl, di(para-trimethylsilylphenyl)methylene(2,7-di-tertbutyl-fluorenyl) (cyclopentadienyl)hafnium dimethyl, (para-trimethylsilylphenyl)(para-t-butylphenyl)methylene(2,7-di tertbutyl fluorenyl)(cyclopentadienyl)hafnium dimethyl or dibenzyl, di(para-trimethylsilylphenyl)methylene(2,7-dimethylfluorenyl)(cyclopentadienyl)hafnium dimethyl or dibenzyl, and bis(p-triethylsilylphenyl)carbyl(cyclopentadienyl)(2,7-di-t-butylfluorenyl)hafnium dimethyl.

Other useful bridged biscyclopentadienyl compounds include: diphenyl methylene (cyclopentadienyl)(9-fluorenyl)hafnium dimethyl, diphenyl methylene (cyclopentadienyl)(2,7-dimethyl-9-fluorenyl)hafnium dimethyl, diphenyl methylene (cyclopentadienyl)(2,7-di-tert-butyl-9-fluorenyl) hafnium dimethyl, di(p-trimethylsilyl-phenyl)methylene (cyclopentadienyl)(fluorenyl)hafnium dimethyl, di(p-trimethylsilyl-phenyl)methylene (cyclopentadienyl)(2,7-dimethyl-9-fluorenyl)hafnium dimethyl, di(p-trimethylsilyl-phenyl)methylene(cyclopentadienyl)(2,7-di-tert-butyl-9-fluorenyl)hafnium dimethyl, di(p-triethylsilyl-phenyl)methylene(cyclopentadienyl)(fluorenyl)hafnium dimethyl, di(p-triethylsilyl-phenyl)methylene(cyclopentadienyl)(2,7-dimethyl-9-fluorenyl)hafnium dimethyl, di(p-triethylsilyl-phenyl)methylene (cyclopentadienyl)(2,7-di-tert-butyl-9-fluorenyl)hafnium dimethyl, (p-triethylsilyl-phenyl)(p-tert-butylphenyl)methylene(cyclopentadienyl)(fluorenyl) hafnium dimethyl, (p-triethylsilyl-phenyl))(p-n-butylphenyl)methylene(cyclopentadienyl)(2,7-dimethyl-9-fluorenyl)hafnium dimethyl, (p-trimethylsilylphenyl)(p-n-butylphenyl)methylene(cyclopentadienyl)(2,7-di-tert-butyl-9-fluorenyl)hafnium dimethyl, and (p-triethylsilyl-phenyl)(p-n-butylphenyl)methylene (cyclopentadienyl)(2,7-dimethyl-9-fluorenyl)hafnium dimethyl.

It has been found that the asymmetric, bridged compounds, such as those listed above, are particularly useful in accordance with the current disclosure.

In particular, for the bridged hafnium compounds, it is thought that increasing the degree of substitution on the aromatic fused-ring substituted ligand contributes increased molecular weight, as is the use of covalent bridges between the cyclopentadienyl ligands having a substituted or unsubstituted carbon atom (—$CH_2$—, or —CHR—, or —$CR_2$—) or substituted silylene (—$SiR_2$—) bridging unit, where each R may be the same or different $C_1$ to $C_{20}$ hydrocarbyl substituent, or where the two R's may be covalently linked to form a cyclic structure. For example, the substitution on the indenyl, fluorenyl or azulenyl radicals in the hafnium compounds will generally comprise two or more $C_1$ to $C_{30}$ hydrocarbon substituents on a 6-member fused-ring as defined above.

In at least one embodiment, the bridged biscyclopentadienyl compound is (p-triethylsilylphenyl)carbyl(cyclopentadienyl)(2,7-di-t-butylfluorenyl)hafnium dimethyl, which is represented by the structure:

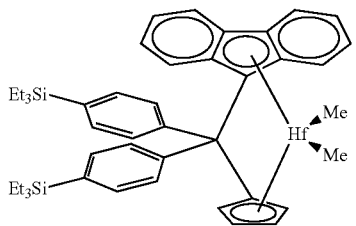

Optional Support Materials

A catalyst system of the present disclosure may include a support material (with or without activator). In at least one embodiment, the supported material is a porous support material, for example, talc, and inorganic oxides. Other support materials include zeolites, clays, organo-clays, or any other suitable organic or inorganic support material, or mixtures thereof.

A support material of the present disclosure can be an inorganic oxide in a finely divided form. Suitable inorganic oxide materials for use in catalyst systems include groups 2, 4, 13, and 14 metal oxides, such as silica, alumina, and mixtures thereof. Other inorganic oxides that may be employed either alone or in combination with the silica, or alumina are magnesia, titania, or zirconia. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, and clays. Also, combinations of these support materials may be used, for example, silica-chromium, silica-alumina, and silica-titania. In at least one embodiment, suitable support materials include $Al_2O_3$, $ZrO_2$, $SiO_2$, and combinations thereof, such as $SiO_2$, $Al_2O_3$, or $SiO_2/Al_2O_3$.

In at least one embodiment, the support material, such as an inorganic oxide, has a surface area in the range of from about 10 $m^2$/g to about 700 $m^2$/g, pore volume in the range of from about 0.1 $cm^3$/g to about 4.0 $cm^3$/g and average particle size in the range of from about 5 µm to about 500 µm. In at least one embodiment, the surface area of the support material is in the range of from about 50 $m^2$/g to about 500 $m^2$/g, pore volume of from about 0.5 $cm^3$/g to about 3.5 $cm^3$/g and average particle size of from about 10 µm to about 200 µm. The surface area of the support material can be in the range from about 100 $m^2$/g to about 400 $m^2$/g, with a pore volume of from about 0.8 $cm^3$/g to about 3.0 $cm^3$/g and an average particle size of from about 5 µm to about 100 µm. The average pore size of the support material useful in the present disclosure can be in the range of from about 10 Å to about 1000 Å, such as about 50 Å to about 500 Å, such as about 75 Å to about 350 Å. In at least one embodiment, the support material is a high surface area, amorphous silica (surface area=about 300 $m^2$/gm; pore volume of about 1.65 $cm^3$/gm). Suitable silicas are marketed under the tradenames of DAVISON 952 or DAVISON 955 by the Davison Chemical Division of W.R. Grace and Company. In at least one embodiment, DAVISON 948 is used.

The support material should be dry, that is, free of absorbed water. Drying of the support material can be effected by heating or calcining at about 100° C. to about 1000° C., such as at least about 600° C. When the support material is silica, it is heated to at least about 200° C., such as about 200° C. to about 850° C., such as at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this disclosure. The calcined support material is then contacted with at least one polymerization catalyst system having at least one catalyst compound and an activator.

The support material, having reactive surface groups, such as hydroxyl groups, is slurried in a non-polar solvent and the resulting slurry is contacted with a solution of a catalyst compound and an activator. In at least one embodiment, the slurry of the support material is first contacted with the activator for a period of time in the range from about 0.5 hours to about 24 hours, from about 2 hours to about 16 hours, or from about 4 hours to about 8 hours. The solution of the catalyst compound is then contacted with the isolated support/activator. In at least one embodiment, the supported catalyst system is generated in situ. In an alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., such as about 23° C. to about 60° C., such as at room temperature. Suitable contact times can range from about 0.5 hours to about 24 hours, from about 2 hours to about 16 hours, or from about 4 hours to about 8 hours.

Suitable non-polar solvents are materials in which all of the reactants used herein, e.g., the activator, and or the catalyst compound, are at least partially soluble and which are liquid at reaction temperatures. Suitable non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed. In at least one embodiment, toluene is used as non-polar solvent for the preparation of the catalyst solutions.

The catalyst precursor, activator, coactivator, if needed, suitable solvent, and support may be added in any order or simultaneously. In at least one embodiment, the complex and activator is combined in solvent to form a solution. Then the support is added, and the mixture is stirred for about 1 minute to about 10 hours. The total solution volume may be greater than the pore volume of the support, but some embodiments limit the total solution volume below that needed to form a gel or slurry (about 90% to about 400%, such as about 100% to about 200% of the pore volume). After stirring, the residual solvent is removed under vacuum, such as at about ambient temperature and over about 10 to about 16 hours. But greater or lesser times and temperatures are possible.

The complex may also be supported absent the activator; in that case, the activator (and co-activator if needed) is added to a polymerization process's liquid phase. Additionally, two or more different complexes may be placed on the same support. Likewise, two or more activators or an activator and co-activator may be placed on the same support.

Suitable solid particle supports can be included of polymeric or refractory oxide materials, each being porous for example. In at least one embodiment, a support material that has an average particle size greater than about 10 μm is suitable. Various embodiments include a porous support material, such as for example, talc, inorganic oxides, inorganic chlorides, for example, magnesium chloride and resinous support materials such as polystyrene polyolefin or polymeric compounds or another organic support material. In at least one embodiment, inorganic oxide materials are support material including group 2, 3, 4, 5, 13, or 14 metal or metalloid oxides. In at least one embodiment, the catalyst support materials include silica, alumina, silica-alumina, and their mixtures. Other inorganic oxides may serve either alone or in combination with the silica, alumina, or silica-alumina. These are magnesia, Mania, or zirconia. Lewis acidic materials such as montmorillonite and similar clays may also serve as a support. In this case, the support can, optionally, double as the activator component; however, an additional activator may also be used.

The support material may be pretreated by any suitable method. For example, inorganic oxides may be calcined, chemically treated with dehydroxylating agents, such as aluminum alkyls, or both.

As stated above, polymeric carriers will also be suitable in accordance with the present disclosure, see for example the descriptions in WO 95/15815 and U.S. Pat. No. 5,427,991. The methods disclosed may be used with the catalyst complexes, activators or catalyst systems of the present disclosure to adsorb or absorb them on the polymeric supports, particularly if made up of porous particles, or may be chemically bound through functional groups bound to or in the polymer chains.

Suitable supports can have a surface area of from about 10 $m^2/g$ to about 700 $m^2/g$, a pore volume of about 0.1 $cm^3/g$ to about 4.0 $cm^3/g$ and an average particle size of about 10 μm to about 500 μm. In at least one embodiment, suitable supports include a surface area of about 50 $m^2/g$ to about 500 $m^2/g$, a pore volume of 0.5 $cm^3/g$ to 3.5 $cm^3/g$, or an average particle size of 10 μm-200 μm. Other embodiments include a surface area of about 100 $m^2/g$ to about 400 $m^2/g$, a pore volume of about 0.8 $cm^3/g$ to about 3.0 $cm^3/g$, and an average particle size of about 50 μm to about 100 μm. Suitable supports can have a pore size of about 10 Å to about 1000 Å, alternatively about 50 Å to about 500 Å, or about 75 Å to about 350 Å.

The catalyst complexes of the present disclosure can be deposited on the support at a loading level of about 10 micromoles to about 100 micromoles of complex per gram of solid support; alternately about 20 micromoles to about 80 micromoles of complex per gram of solid support; or about 40 micromoles to about 60 micromoles of complex per gram of support. But greater or lesser values may be used provided that the total amount of solid complex does not exceed the support's pore volume.

Activators

The terms "cocatalyst" and "activator" are used herein interchangeably and are defined to be a compound which can activate one or more of the catalyst compounds described above by converting the neutral catalyst compound to a catalytically active catalyst compound cation.

After the complexes have been synthesized, catalyst systems may be formed by combining the complexes with activators in any suitable manner including by supporting them for use in slurry or gas phase polymerization. The catalyst systems may also be added to or generated in solution polymerization or bulk polymerization (in the monomer). Suitable catalyst system may include a complex as described above and an activator such as alumoxane or a non-coordinating anion.

Non-limiting activators, for example, include alumoxanes, aluminum alkyls, ionizing activators, which may be neutral or ionic, and other suitable cocatalysts. Suitable activators may include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane Activators

In at least one embodiment, alumoxane activators are utilized as an activator in the catalyst system. The alkylalumoxane may be used with another activator. Alumoxanes are generally oligomeric compounds containing —Al(R')—O— sub-units, where $R^1$ is an alkyl group. Examples of alumoxanes include methylalumoxane (MAO), modified methylalumoxane (MMAO), ethylalumoxane, and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. For example, a visually clear methylalumoxane can be used. A cloudy or gelled alumoxane can be filtered to produce a clear solution or clear alumoxane can be decanted from the cloudy solution. Suitable alumoxane can be a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Another suitable alumoxane is solid polymethylaluminoxane as described in U.S. Pat. Nos. 9,340,630; 8,404,880; and 8,975,209.

When the activator is an alumoxane (modified or unmodified), embodiments may include the maximum amount of activator such as at up to about a 5000-fold molar excess Al/M over the catalyst compound (per metal catalytic site). The minimum activator-to-catalyst-compound is about a 1:1 molar ratio. Alternate suitable ranges include from about 1:1 to about 500:1, alternately from about 1:1 to about 200:1, alternately from about 1:1 to about 100:1, or alternately from about 1:1 to about 50:1. In an alternate embodiment, little or no alumoxane is used in the polymerization processes described herein. In at least one embodiment, alumoxane is present at about zero mole %, alternately the alumoxane is present at a molar ratio of aluminum to catalyst compound transition metal less than about 500:1, such as less than about 300:1, such as less than about 100:1, such as less than about 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any suitable metal or metalloid that can form a compatible, weakly coordinating complex may be used or contained in the non-coordinating anion. Suitable metals include aluminum, gold, and platinum. Suitable metalloids include boron, aluminum, phosphorus, and silicon.

"Compatible" non-coordinating anions can be those which are not degraded to neutrality when the initially formed complex decomposes, and the anion does not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri(n-butyl) ammonium tetrakis(pentafluorophenyl)borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of the present disclosure to use neutral or ionic activators alone or in combination with alumoxane or modified alumoxane activators.

The catalyst systems of the present disclosure can include at least one NCA activator.

In at least one embodiment, boron containing NCA activators represented by the formula below is used:

$$Z_d^+(A^{d-})$$

where: Z is (L-H) or a reducible Lewis acid; L is a neutral Lewis base; H is hydrogen; $(L-H)^+$ is a Brønsted acid; $A^{d-}$ is a non-coordinating anion, for example a boron containing non-coordinating anion having the charge d−; and d is 1, 2, or 3.

The cation component, $Z_d^+$ may include Brønsted acids such as protons or protonated Lewis bases or reducible Lewis acids capable of protonating or abstracting a moiety, such as an alkyl or aryl, from the bulky ligand containing transition metal catalyst precursor, resulting in a cationic transition metal species.

The activating cation $Z_d^+$ may also be a moiety such as silver, tropylium, carboniums, ferroceniums and mixtures, such as carboniums and ferroceniums, such as $Z_d^+$ is triphenyl carbonium. Suitable reducible Lewis acids can be a triaryl carbonium (where the aryl can be substituted or unsubstituted, such as those represented by the formula: $(Ar_3C^+)$, where Ar is aryl substituted with a $C_1$ to $C_{40}$ hydrocarbyl or with a substituted $C_1$ to $C_{40}$ hydrocarbyl, or a heteroaryl substituted with a $C_1$ to $C_{40}$ hydrocarbyl, or with a substituted $C_1$ to $C_{40}$ hydrocarbyl; such as the reducible Lewis acids in "Z" include those represented by the formula: $(Ph_3C)$, where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbonium.

When $Z_d^+$ is the activating cation $(L-H)_d^+$, such as a Brønsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (such as 1, 2, 3, or 4); n−k=d; M is an element selected from group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. In at least one embodiment, each Q is a fluorinated hydrocarbyl group having 1 to 20 carbon atoms, such as each Q is a fluorinated aryl group, such as each Q is a pentafluoryl aryl group. Examples of suitable $A^{d-}$ also include diboron compounds as disclosed in U.S. Pat. No. 5,447,895, which is fully incorporated herein by reference.

Examples of boron compounds which may be used as an activating cocatalyst include the compounds described as (and particularly those specifically listed as) activators in U.S. Pat. No. 8,658,556, which is incorporated by reference herein.

Bulky activators are also useful herein as NCAs. "Bulky activator" as used herein refers to anionic activators represented by the formula:

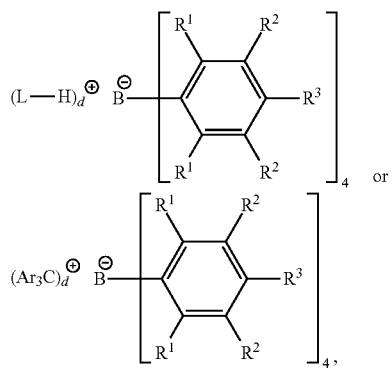

wherein:
each $R^1$ is, independently, a halide, such as a fluoride;
Ar is a substituted or unsubstituted aryl group (such as a substituted or unsubstituted phenyl), such as substituted with $C_1$ to $C_{40}$ hydrocarbyls, such as $C_1$ to $C_{20}$ alkyls or aromatics;
each $R^2$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (such as $R^2$ is a fluoride or a perfluorinated phenyl group);
each $R^3$ is a halide, $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group (such as $R^3$ is a fluoride or a $C_6$ perfluorinated aromatic hydrocarbyl group); wherein $R^2$ and $R^3$ can form one or more saturated or unsaturated, substituted or unsubstituted rings (such as $R^2$ and $R^3$ form a perfluorinated phenyl ring);
L is a neutral Lewis base; (L-H)$^+$ is a Brønsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

Suitable $(Ar_3C)_d^+$ is $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3$V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful bulky activators as described in U.S. Pat. No. 8,658,556, which is incorporated by reference herein.

In at least one embodiment, one or more of the NCA activators is chosen from the activators described in U.S. Pat. No. 6,211,105.

Suitable activators include N,N-dimethylanilinium tetrakis(perfluoronaphthyl)borate, N,N-dimethylanilinium tetrakis(perfluorophenyl)borate, triphenylcarbenium tetrakis(perfluorophenyl)borate, [Ph$_3$C$^+$][B(C$_6$F$_5$)4$^-$], [Me$_3$NH$^+$][B(C$_6$F$_5$)4$^-$], 1-(4-(tris(pentafluorophenyl)borate)-2,3,5,6-tetrafluorophenyl)pyrrolidinium, 4-(tris(pentafluorophenyl)borate)-2,3,5,6-tetrafluoropyridine.

In at least one embodiment, the activator includes a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate.

Suitable activator may include one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, iso-butyl, or t-butyl).

In at least one embodiment, the ionic activator $Z_d^+$ ($A^{d-}$) is one or more of N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis (perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, and tropillium tetrakis(perfluoronaphthyl)borate.

Suitable activator-to-catalyst ratio, e.g., all NCA activators-to-catalyst ratio is about a 1:1 molar ratio. Alternate suitable ranges include from about 0.1:1 to about 100:1, alternately from about 0.5:1 to about 200:1, alternately from about 1:1 to about 500:1, alternately from about 1:1 to about 1000:1. A particularly useful range is from about 0.5:1 to about 10:1, such as about 1:1 to about 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 94/07928; and WO 95/14044 which discuss the use of an alumoxane in combination with an ionizing activator).

Alternately, a co-activator or chain transfer agent, such as a group 1, 2, or 13 organometallic species (e.g., an alkyl aluminum compound such as tri-n-octyl aluminum), may also be used in the catalyst system herein. The complex-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

In at least one embodiment, the activator is N,N-dimethylanilinium tetrakis(pentafluorophenyl)borate.

Optional Scavengers or Co-Activators

In addition to these activator compounds, one or more scavengers or co-activators may be used in the catalyst system. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc. Those scavengers having bulky or $C_6$ to $C_{20}$ linear hydrocarbyl substituents connected to the metal or metalloid center usually minimize adverse interaction with the active catalyst. Examples include triethylaluminum, such as bulky compounds, such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavengers may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$). In at least one embodiment, the scavengers are present at less than about 14 wt %, or from about 0.1 wt % to about 10 wt %, or from about 0.5 wt % to about 7 wt %, by weight of the catalyst system.

Suitable aluminum alkyl or organoaluminum compounds which may be utilized as co-activators include, for example, trimethylaluminum, triethylaluminum, tri-iso-butylaluminum, tri-n-hexylaluminum, or tri-n-octylaluminum. In an embodiment, the co-activators are present at less than about 14 wt %, or from about 0.1 to about 10 wt %, or from about 0.5 to about 7 wt %, by weight of the catalyst system. Alternately, the complex-to-co-activator molar ratio is from about 1:100 to about 100:1; about 1:75 to about 75:1; about 1:50 to about 50:1; about 1:25 to about 25:1; about 1:15 to about 15:1; about 1:10 to about 10:1; about 1:5 to about 5:1; about 1:2 to about 2:1; about 1:100 to about 1:1; about 1:75 to about 1:1; about 1:50 to about 1:1; about 1:25 to about 1:1; about 1:15 to about 1:1; about 1:10 to about 1:1; about 1:5 to about 1:1; about 1:2 to about 1:1; about 1:10 to about 2:1.

Polymerization Processes

The present disclosure relates to polymerization processes where monomers (e.g., ethylene), and cyclic olefin comonomers (e.g., norbornene) are contacted with a catalyst system including an activator and at least one catalyst compound, as described above. The catalyst compound and activator may be combined in any order, and are combined prior to contacting with the monomers.

Monomers include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer includes ethylene or $C_4$ to $C_{40}$ olefins, such as $C_7$ to $C_{20}$ olefins. The $C_4$ to $C_{40}$ olefin monomers may be linear, branched, or cyclic. The $C_4$ to $C_{40}$ olefin monomers may be strained or unstrained, monocyclic or polycyclic, and may optionally include heteroatoms and or one or more functional groups.

Exemplary $C_2$ to $C_{40}$ olefin monomers may include ethylene, propylene, butene, pentene, hexene, heptene, octene, nonene, decene, undecene, dodecene.

Polymers of the present disclosure further include one or more $C_5$ to $C_{40}$ cyclic olefin comonomers, such as $C_5$ to $C_{20}$ cyclic olefin comonomers, such as $C_5$ to $C_{10}$ cyclic olefin comonomers, such as a $C_7$ cyclic olefin comonomer. $C_5$ to $C_{40}$ cyclic olefin comonomers may include linear, branched, or cyclic substituents. The $C_5$ to $C_{40}$ cyclic olefin comonomers may be strained or unstrained, monocyclic or polycyclic, and may optionally include heteroatoms and or one or more functional groups.

Exemplary $C_2$ to $C_{40}$ cyclic olefin comonomers can include norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene. In at least one embodiment, a cyclic olefin comonomer is norbornene.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be used. (A homogeneous polymerization process is a process where at least 90 wt % of the product is soluble in the reaction media.) A bulk homogeneous process can be used. (A bulk process is a process where monomers being polymerized also serves as solvent or diluent and the monomer concentration in all feeds to the reactor is at least 70 volume % or more.) Alternately, no inert hydrocarbon is present or added in the reaction medium as a solvent or diluent, (except for the small amounts used as the carrier for the catalyst system or other additives, or amounts found with the monomer; e.g., propane in propylene). In at least one embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst can be in granular form as solid particles (not dissolved in the diluent). In an alternate embodiment, the process is a solution polymerization process.

A polymer can be recovered from the effluent of any one or more polymerizations by separating the polymer from other constituents of the effluent using conventional separation means. For example, polymer can be recovered from a polymerization effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Suitable antioxidants may include phenyl-beta-naphthylamine, di-tert-butylhydroquinone, triphenyl phosphate, heptylated diphenylamine, 2,2'-methylene-bis (4-methyl-6-tert-butyl)phenol, and 2,2,4-trimethyl-6-phenyl-1,2-dihydroquinoline. Other methods of recovery such as by the use of lower critical solution temperature (LCST) followed by devolatilization are also envisioned. The catalyst may be deactivated as part of the separation procedure to reduce or eliminate further uncontrolled polymerization downstream the polymer recovery processes. Deactivation may be effected by the mixing with suitable polar substances such as water, whose residual effect following recycle can be counteracted by suitable sieves or scavenging systems.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

Polymerizations can be run at any temperature and or pressure suitable to obtain the desired ethylene polymers. Suitable temperatures and or pressures may include a temperature in the range of from about 0° C. to about 300° C., such as about 20° C. to about 200° C., such as about 35° C. to about 150° C., such as from about 40° C. to about 120° C., such as from about 45° C. to about 80° C., such as the temperature of polymerization can be 130° C.; and at a pressure in the range of from about 0.35 MPa to about 10 MPa, such as from about 0.45 MPa to about 6 MPa, such as from about 0.5 MPa to about 4 MPa, such as from about 0.55 MPa to about 3 MPa, such as from about 0.60 MPa to about 2 MPa, such as from about 0.65 MPa to about 1 MPa (such as from about 0.95 psig to about 145 psig), such as the polymerization process may be carried out at a pressure of about 2.4 MPa.

In at least one embodiment, hydrogen is present in the polymerization reactor at a partial pressure of 0.001 psig to 50 psig (0.007 kPa to 345 kPa), such as from 0.01 psig to 25 psig (0.07 kPa to 172 kPa), such as 0.1 psig to 10 psig (0.7 kPa to 70 kPa). Alternatively, 500 ppm or less, or 400 ppm or less, or 300 ppm of less of hydrogen can be added into the reactor. In another embodiment, at least 50 ppm of hydrogen is added, such as 100 ppm or greater, such as 200 ppm or greater. Thus, certain embodiments include hydrogen added to the reactor in amounts ranging from a low of any one of about 50 ppm, 100 ppm, 150 ppm, and 200 ppm to a high of any one of about 250 ppm, 300 ppm, 350 ppm, 400 ppm, 450 ppm, and 500 ppm.

In at least one embodiment, the activity of the catalyst system is at least 50 g/mmol/hour, such as 500 g/mmol/hour or greater, such as 5000 g/mmol/hr or greater, such as 50,000 g/mmol/hr or greater, such as 100,000 g/mmol/hr or greater. Alternatively, the catalyst efficiency can be 10,000 kg of polymer per kg of catalyst or more, such as 20,000 kg of polymer per kg of catalyst or more, such as 30,000 kg of polymer per kg of catalyst or more, such as 40,000 kg of polymer per kg of catalyst or more, such as 50,000 kg of polymer per kg of catalyst or more, such as the catalyst efficiency can be of from about 10,000 kg of polymer per catalyst to about 60,000 kg of polymer per catalyst.

In at least one embodiment, the conversion of olefin monomer is at least 10%, based upon polymer yield and the weight of the monomer entering the reaction zone, such as 20% or more, such as 30% or more, such as 50% or more.

In at least one embodiment, little or no alumoxane is used in the process to produce the polymers. For example, alumoxane is present at zero mol %, alternately the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. For example, scavenger (such as tri alkyl aluminum) is present at zero mol %, alternately the scavenger is present at a molar ratio of scavenger metal to transition metal of less than 100:1, such as less than 50:1, such as less than 15:1, such as less than 10:1.

In at least one embodiment, the polymerization: 1) is conducted at temperatures of 0° C. to 300° C. (such as 130° C.); 2) is conducted at a pressure of atmospheric pressure to 10 MPa (such as 0.35 MPa to 10 MPa, such as from 0.45 MPa to 6 MPa, such as from 0.5 MPa to 4 MPa, such as from 0.65 MPa to 2.5 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics are present in the solvent at less than 1 wt %, such as less than 0.5 wt %, such as at 0 wt % based upon the weight of the solvents), such as isohexane; 4) where the catalyst system used in the polymerization includes less than 0.5 mol %, such as 0 mol % alumoxane, alternately the alumoxane is present at a molar ratio of aluminum to transition metal less than 500:1, such as less than 300:1, such as less than 100:1, such as less than 1:1; 5) the polymerization occurs in one reaction zone; 6) the efficiency of the catalyst compound is at least 10,000 kg of polymer per kg of catalyst; 7) optionally scavengers (such as trialkyl aluminum compounds) are absent (e.g., present at zero mol), alternately the scavenger is present at a molar ratio of scavenger metal to transition metal of less than 100:1, such as less than 50:1, such as less than 15:1, such as less than 10:1); and 8) hydrogen can be present in the polymerization reactor at a concentration of 500 ppm or less, such as 300 ppm or less. In at least one embodiment, the catalyst system used in the polymerization includes no more than one catalyst compound. A "reaction zone" also referred to as a "polymerization zone" is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. Room temperature is 23° C. unless otherwise noted.

Other additives may also be used in the polymerization, such as one or more scavengers, promoters, modifiers, chain transfer agents (such as diethyl zinc), reducing agents, oxidizing agents, hydrogen, aluminum alkyls, or silanes.

Chain transfer agents may include alkylalumoxanes, a compound represented by the formula $AlR_3$ or $ZnR_2$ (where each R is, independently, a $C_1$ to $C_8$ aliphatic radical, such as methyl, ethyl, propyl, butyl, pentyl, hexyl, octyl or an isomer thereof), or a combination thereof, such as diethyl zinc, methylalumoxane, trimethylaluminum, triisobutylaluminum, trioctylaluminum, or a combination thereof.

Cyclic Olefin Copolymer Products

This disclosure also relates to compositions of matter produced by methods of the present disclosure. In at least one embodiment, the catalyst systems and methods herein produce cyclic olefin copolymers.

The copolymer contains about 75 wt % or greater and up to 99.5 wt % olefin-derived units, based on the total weight of the copolymer. For example, the copolymer has a $C_2$-$C_{40}$ olefin content of about 85 wt % to about 99.5 wt %, such as of about 86 wt % to about 98 wt %, such as of about 87 wt % to about 96 wt %. Correspondingly, the cyclic olefin copolymer has from about 0.5 wt % to about 25 wt % cyclic olefin-derived units, based on the total weight of the copolymer. For example, a cyclic olefin copolymer can have a cyclic olefin content of from about 0.5 wt % to about 25 wt %, such as from about 1 wt % to about 20 wt %, such as from about 2 wt % to about 15 wt %, such as from about 3 wt % to about 10 wt %, such as from about 4 wt % to about 8 wt %, alternatively from about 9 wt % to about 15 wt %, based on the total weight of the copolymer.

In at least one embodiment, a cyclic olefin is selected from one or more of dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives. In at least one embodiment, a cyclic olefin is norbornene.

A cyclic olefin copolymer can have a heat of fusion "Hf", as determined by the Differential Scanning Calorimetry ("DSC"), of 250 J/g or less, such as from 85 J/g to 230 J/g, such as from 90 J/g to 200 J/g, a melting point ($T_m$) of 130° C. or less, such as from about 90° C. to about 125° C., such as from about 100° C. to about 120° C. and a crystallization temperature "Tc" of 120° C. or less, such as from about 75° C. to about 115° C., such as from about 80° C. to about 110° C.

In at least one embodiment, the cyclic olefin copolymer has a melt index from about 0.02 g/10 min to about 5 g/10 min, such as from about 0.03 g/10 min to about 4.8 g/10 min, such as from about 0.04 g/10 min to about 4.6 g/10 min, such as from about 0.05 g/10 min to about 4.4 g/10 min, such as from about 0.06 g/10 min to about 4.2 g/10 min, such as from about 0.07 g/10 min to about 3.8 g/10 min.

In at least one embodiment, the cyclic olefin copolymer has a high load melt index (HLMI, ASTM 1238) from about 1 g/10 min to about 130 g/10 min; such as from about 2 g/10 min to about 125 g/10 min, such as from about 3 g/10 min to about 120 g/10 min, such as from about 4 g/10 min to about 115 g/10 min.

In at least one embodiment, the cyclic olefin copolymer has a melt index ratio (MIR) value greater than 25, such as from 25 to 70, such as from 26 to 65, such as from 27 to 60, such as from 28 to 55.

A cyclic olefin copolymer can have a density of about 0.91 $g/cm^3$ to about 0.96 $g/cm^3$, such as from about 0.915 $g/cm^3$ to about 0.95 $g/cm^3$, such as from about 0.92 $g/cm^3$ to about 0.94 $g/cm^3$, such as from about 0.92 $g/cm^3$ to about 0.933 $g/cm^3$.

In at least one embodiment, the cyclic olefin copolymer has a melt strength of about 1 cN or greater, such as about 1 cN to about 16 cN, such as from about 5 cN to about 15 cN, such as from about 7 cN to about 14 cN, such as from about 10 cN to about 14 cN.

The cyclic olefin copolymer can have an elongation stress Sigma Z of from 0.01 MPa to 0.6 MPa, such as from 0.01 MPa to 0.55 MPa, such as from 0.01 MPa to 0.5 MPa, such as from 0.01 MPa to 0.48 MPa, alternatively 0 MPa.

In at least one embodiment, the copolymer has an number averaged molecular weight of from about 20,000 g/mol to about 200,000 g/mol, such as form about 30,000 g/mol to about 150,000 g/mol, such as from about 50,000 g/mol to about 120,000 g/mol; a weight averaged molecular weight of from about 50,000 g/mol to about 400,000 g/mol, such as from about 75,000 g/mol to about 300,000 g/mol, such as from about 100,000 g/mol to about 250,000 g/mol; and a polydispersity (PDI defined as Mw/Mn) of about 1.5 to about 7.5, such as from about 2.0 to 7, such as from about 2.5 to about 6.5. Molecular weight is determined by Gel Permeation Chromatography (GPC).

In at least one embodiment, the ethylene copolymer has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

Blends

Compositions of the present disclosure including cyclic olefin copolymers can be combined with one or more additional polymer(s) in a blend prior to being formed into a film, molded part, or other article. As used herein, a "blend" may refer to a dry or extruder blend of two or more different polymers, and in-reactor blends, including blends arising from the use of multi or mixed catalyst systems in a single reactor zone, and blends that result from the use of one or more catalyst(s) in one or more reactor(s) under the same or different conditions (e.g., a blend resulting from in series reactors (the same or different) each running under different conditions and or with different catalysts).

Useful additional polymers include, but are not limited to, other polyethylenes, isotactic polypropylene, syndiotactic polypropylene, random copolymer of propylene and ethylene, and or butene, and or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and or polyisobutylene.

Films

The present disclosure also relates to films including the cyclic olefin copolymers. The copolymers disclosed herein may be utilized to prepare monolayer films or multilayer films. These films may be formed by any extrusion or coextrusion techniques discussed below. Films may be unoriented, uniaxially oriented or biaxially oriented. Physical properties of the film may vary depending on the film forming techniques used.

In at least one embodiment, films containing the cyclic olefin copolymers monolayer or multilayer, may be formed by using casting techniques, such as a chill roll casting process. Exemplary of such chill roll casting processes and apparatus can be described in The Wiley-Encyclopedia of Packaging Technology, Second Edition, A. L. Brody and K. S. Marsh, Ed., John Wiley and Sons, Inc., New York (1997). Although chill roll casting is one example, other forms of casting may be employed.

In at least one embodiment, films containing the inventive cyclic olefin copolymers, monolayer or multilayer, may be formed using blown techniques, i.e., to form a blown film. For example, the composition can be extruded in a molten state through an annular die and then blown and cooled to form a tubular, blown film, which can then be axially slit and unfolded to form a flat film. An example of blown films preparation can be as follows. The copolymer or blend thereof is introduced into the feed hopper of an extruder, such as a 63 mm Egan extruder that is water-cooled, resistance heated, and has an L/D ratio of 24:1. The film can be produced using a spiral mandrel die equipped with a 60 mil die gap, and operated using a 3:1 BUR. The polymer melt is extruded through the die into a film cooled by blowing air onto the surface of the film. The film is drawn from the die forming a cylindrical tube of the molten film that is cooled, collapsed and, optionally, subjected to a desired auxiliary process, such as slitting, treating, sealing, or printing. Suitable melt temperatures can be from about 175° C. to about 225° C., such as from about 180° C. to about 215° C., such as from about 185° C. to about 210° C. Blown film rates can be from 5 lbs per hour per inch of die circumference to 25 lbs per hour per inch of die circumference, such as from 10 lbs per hour per inch of die circumference to 20 lbs per hour per inch of die circumference. The finished film can be wound into rolls for later processing, or can be fed into a bag machine and converted into bags. An example of a blown film process and apparatus suitable for forming films according to U.S. Pat. No. 5,569,693. Of course, other blown film forming methods can also be used.

Physical properties of the film can vary from those of the copolymer, depending on the film forming techniques used. The films can be of any desirable thickness or composition. In at least one embodiment, films are within a range of from about 0.5 mil to about 20 mils, such as from about 1 mils to about 15 mils, such as from about 2 mils to about 10 mils, for example about 6 mils. The films can include other additives such as pigments, antioxidants, fillers, etc. The films of the present disclosure have a combination of unique and useful properties as described in more detail below. For example, a film of the present disclosure can have an additive content of from about 0.1 wt % to about 15 wt %, such as from about 1 wt % to about 5 wt %.

In at least one embodiment, the present disclosure relates to a film including, for example, at least 5 wt % of the cyclic olefin copolymer based on the total weight of the film. For example, a film can have a cyclic olefin copolymer content of from about 5 wt % to about 99.9 wt %, such as from about 10 wt % to about 30 wt %, alternatively from about 90 wt % to about 99.9 wt %. Films comprising cyclic olefins can have, for example, a melt index from about 0.05 g/10 min to about 2.5 g/10 min; a melt index ratio (MIR) of about 15 to 50; a 1% Secant Modulus MD of from about 20,000 psi or greater, such as from about 20,000 psi to about 75,000 psi, and 1% Secant Modulus TD of 25,000 psi or greater, such as from about 25,000 psi to about 80,000 psi; a Tensile Strength at Yield of about 1,500 psi to about 3,500 psi, an Elmendorf Tear (ASTM D1922) MD value of 15 g/mil to about 350 g/mil and an Elmendorf Tear TD value of 145 g/mil to about 1200 g/mil; a Dart Drop impact strength performance (Dart Impact) of about 75 g/mil to about 750 g/mil; a shrink MD of about 25% to about 75% and a shrink TD of about −10% to about 100%; a haze (ASTM D1003-95) of less than about 25%, such as from about 1% to about 25%; an internal haze of about 1% to about 10%; a Gloss MD (ASTM D2457-90) of about 10 to 30 and a Gloss TD (ASTM D2457-90) of about 10 to 30.

Furthermore, films of the present disclosure can have an excellent heat sealing and hot tack performance. For example, a film can have a hot tack strength of from 2 (N/25.4 mm) to 18 (N/25.4 mm) at a temperature of 125° C., such as from about 10 (N/25.4 mm) to about 13 (N/25.4 mm).

"Hot tack" is the strength of a heat seal immediately after sealing, while still in a hot condition, that is, before it has cooled down to ambient temperature and achieved its final strength. In production lines, the package is often filled by dropping the product into the package from a certain height, or by horizontally filling, both of which will exert a force on the package bottom. If the package bottom cannot resist the disruptive force of filling, the seal on the bottom of the package will fail. For optimum production line efficiency, the interval between heat-sealing the film to make the package and filling the package with product is very short, and it is usually not possible for seal completely cool before filling. Accordingly, hot tack strength becomes important.

Films of the present disclosure can have a heat seal strength of from about 2 lbs to 16 lbs at a seal bar temperature of 130° C., such as from about 4 lbs to about 12 lbs, such as from about 6 lbs to about 9 lbs. The films may have a seal initiation temperature so that it is suitable for packaging applications, such as food packaging. Suitable seal initiation temperature ("SIT") may depend on the end use application of the film, for example, for chocolate bars the SIT may be the temperature at which the seal strength is 200 g/inch, for potato chips in the United States the desired SIT may be the temperature at which the seal strength is 500 g/inch), and for potato chips in Asia the SIT may be the temperature at which the seal strength is 1000 g/inch). The SIT may also depend on the type of seal used, for example, a fin seal as compared to a crimp seal.

The films prepared from the cyclic olefin copolymers have a good balance of stiffness versus toughness as indicated by machine direction tear strength (MD Elmendorf Tear), 1% Secant Modulus (MD), and dart drop impact strength performance (Dart Impact), as well as good shrink performance and excellent optical properties. Furthermore, films prepared from the cyclic olefin copolymers display high clarity property and superior melt strength.

In at least one embodiment, the films have a 1% Secant Modulus in the machine direction (1% Secant Modulus MD), reported in pounds per square inch (psi), measured according to ASTM D882-95a, of 20,000 psi or greater, such as from about 20,000 psi to about 75,000 psi, such as from about 20,500 psi to about 70,000 psi, such as from 20,000 psi to 40,000 psi, alternatively from about 40,000 psi to about 55,000 psi, such as from about 22,000 psi to about 50,000 psi.

The films may have an MD Elmendorf Tear, as measured by ASTM D1922-94, of 15 g/mil or greater. In at least one embodiment, the films have an MD Elmendorf Tear of from about 15 g/mil to about 350 g/mil, such as from about 17 g/mil to about 300 g/mil, such as from about 20 g/mil to about 150 g/mil, alternatively from about 150 g/mil to about 225 g/mil.

The films may have a Dart Impact, as measured according to ASTM D1709-91 (Method A), of from about 75 g/mil to about 750 g/mil, such as from about 80 g/mil to 250 g/mil, alternatively from about 250 g/mil to about 450 g/mil.

In at least one embodiment, a film has a total haze, as measured according to ASTM D1003, of from about 1% to about 25%, such as from about 3% to about 20%, such as from about 3% to about 15%, such as from about 3% to about 12%, such as from about 3% to about 10%.

The films may have an internal haze, as measured according to ASTM D1003, of from about 1% to about 10%, such as from about 1% to about 8%, such as about 1% to about 6%. Internal haze is the haze excluding any film surface contribution. The film surfaces are coated with ASTM approved inert liquids to eliminate any haze contribution from the film surface topology.

In at least one embodiment, the films have a Gloss 45° MD, as measured according to ASTM D2457-90, of from about 3 to about 30, such as from about 5 to about 28, such as from about 6 to about 15, alternatively from about 15 to about 24.

The films described can be used as shrink films, and in a particular embodiment, shrink films in which the transverse direction ("TD") of the film heat-shrinks to a greater extent than in the machine direction ("MD") of the films. Also, the films described undergo TD shrinkage of greater than 40%, such as 50% at desirably low temperatures; at less than 130° C. in one embodiment, and at less than 125° C. in another embodiment, and at less than 120° C. in yet another embodiment, and at less than 110° C. in yet another embodiment. In a particular embodiment, the TD shrinkage is greater than 40%, such as 50% at a given temperature of from 110° C. to 115° C., or 120° C., or 125° C., while the MD shrinkage is less than 10% or 15% at a given temperature at the same temperature ranges. In another embodiment, the TD shrinkage is greater than 40%, such as 50% at 121° C., while the MD shrinkage is less than 10% or 15% at the same temperature. The thermal shrinkage is determined according to ASTM D2732. The films may have an MD shrink of from about 25% to about 75%, such as from about 30% to about 55%, such as from about 30% to about 40%; and a puncture at break energy, as measured according to ASTM D5748, of from about 5 in-lbs/mil to about 25 in-lbs/mil, such as from about 11 in-lbs/mil to 22 in-lbs/mil, such as from about 12 in-lbs/mil to about 17 in-lbs/mil.

The films of the present disclosure can have an excellent "drawability", which is the melt strength of the polymer used to make the blown film and is the ratio of the die gap to film gauge after the polymer is drawn out into a film. The films can be made with gauges of 0.5 mil, 0.75 mil, 1 mil, or 3 mil from a melt extruded using a 60 mil die gap. A higher drawability or "Draw" is desirable. In at least one embodiment, the total draw of the films prepared from the cyclic olefin copolymers is 20 or greater, such as 60 or greater, such as 80 or greater, such as 120 or greater.

The films of the present disclosure can possess an excellent balance of mechanical properties, toughness, sealability and cling/adhesive properties. As such, the films can be used in hot fill applications or packaging materials heated at temperatures up to 260° F. (126° C.) during packaging, such as cement, sand, salt, and retort bag applications such as pouches, bags and sacks containing consumer products including food. The films can also be used for shrink films and form fill and seal applications requiring abuse resistance. The films also possess good softness/feel and exceptional optical/clarity properties useful for food packaging at any temperature.

In addition to films, the copolymers described herein will find utility in other applications like, but not limited to: extrusion coating, injection molding, rotomolding, and blow molding applications.

The films of the present disclosure may vary in thickness depending on the intended application; however, films of a thickness from 10 μm to 50 μm can be suitable for use as, for example, packaging and or as a sealing layer. There may be a sealing layer on both the inner and outer surfaces of the film or the sealing layer may be present on only the inner or the outer surface.

One or more layers can be modified by corona treatment, electron beam irradiation, gamma irradiation, flame treatment, or microwave. In at least one embodiment, one or both of the surface layers is modified by corona treatment.

The various descriptive elements and numerical ranges disclosed herein for the cyclic olefin copolymers and films can be combined with other descriptive elements and numerical ranges to describe the present disclosure; further, for a given element, any upper numerical limit can be combined with any lower numerical limit described herein. The features of the present disclosure are demonstrated in the following non-limiting examples.

End Uses

Any of the foregoing polymers and compositions in combination with optional additives (see, for example, U.S. Patent Application Publication No. 2016/0060430, paragraphs [0082]-[0093]) may be used in a variety of end-use applications. End uses include polymer products and products having specific end-uses. Exemplary end uses are films, film-based products, diaper back sheets, house wrap, wire and cable coating compositions, articles formed by molding techniques, e.g., injection or blow molding, extrusion coating, foaming, casting, and combinations thereof. End uses also include products made from films, e.g., bags, packaging, and personal care films, pouches, medical products, such as for example, medical films and intravenous (IV) bags.

This invention also relates to:
1. A copolymer comprising:
   a $C_2$-$C_{40}$ monomer content of from about 75 wt % to about 99.5 wt %; and
   a $C_5$-$C_{40}$ cyclic olefin comonomer content of from about 0.5 wt % to about 25 wt %;

wherein the copolymer has a density of about 0.91 g/cm$^3$ to about 0.933 g/cm$^3$.

2. The copolymer of paragraph 1, wherein the C$_2$-C$_{40}$ monomer is ethylene.

3. The copolymer of paragraphs 1 or 2, wherein the C$_5$-C$_{40}$ cyclic olefin comonomer is selected from one or more of dicyclopentadiene, cyclopentene, cycloheptene, cyclooctene, cyclooctadiene, cyclododecene, 7-oxanorbornene, 7-oxanorbornadiene, 1-hydroxy-4-cyclooctene, 1-acetoxy-4-cyclooctene, 5-methylcyclopentene, cyclopentene, dicyclopentadiene, norbornene, and norbornadiene.

4. The copolymer of paragraph 3, wherein the C$_5$-C$_{40}$ cyclic olefin comonomer is norbornene.

5. The copolymer of any of paragraphs 1 to 4, wherein the C$_5$-C$_{40}$ cyclic olefin comonomer content is from about 9 wt % to about 15 wt %.

6. The copolymer of any of paragraphs 1 to 5, wherein the copolymer has a density bout 0.92 g/cm$^3$ to about 0.933 g/cm$^3$.

7. The copolymer of any of paragraphs 1 to 6, wherein the copolymer has a melt strength of from about 7 cN to about 14 cN.

8. The copolymer of paragraph 7, wherein the copolymer has a melt strength of from about 10 cN to about 14 cN.

9. The copolymer of any of paragraphs 1 to 8, wherein the copolymer has a melt index ratio of from about 25 to about 70.

10. The copolymer of paragraph 9, wherein the copolymer has a melt index ratio of from about 28 to about 55.

11. A film comprising the copolymer of any of paragraphs 1 to 10.

12. The film of paragraph 11, wherein the film has a thickness of from about 1 mil to about 20 mils.

13. The film of any of paragraphs 11 or 12, wherein the film has a total haze of about 1% to about 25%.

14. The film of paragraph 13, wherein the film has a total haze of about 3% to about 10%.

15. The film of any of paragraphs 11 to 14, wherein the film has an internal haze of from about 1% to about 10%.

16. The film of paragraph 15, wherein the film has an internal haze of from about 1% to about 6%.

17. The film of any of paragraphs 11 to 16, wherein the film has a 1% Secant Modulus MD of from about 20,000 psi to about 75,000 psi.

18. The film of any of paragraphs 11 to 17, wherein the film has a hot tack strength of from about 2 (N/25.4 mm) to about 18 (N/25.4 mm) at a temperature of 125° C.

19. The film of paragraph 18, wherein the film has a hot tack strength of from about 10 (N/25.4 mm) to about 13 (N/25.4 mm) at a temperature of 125° C.

20. The film of any of paragraphs 11 to 19, wherein the film has a heat seal strength of from about 2 lbs/in$^2$ to about 12 lbs/in$^2$ at a seal bar temperature of 130° C.

21. The film of paragraph 20, wherein the film has a heat seal strength of from about 6 lbs/in$^2$ to about 9 lbs/in$^2$ at a seal bar temperature of 130° C.

22. The film of any of paragraphs 11 to 21, wherein the film has an MD Elmendorf Tear of from about 20 g/mil to about 150 g/mil.

23. The film of any of paragraphs 11 to 22, wherein the film has an MD Elmendorf Tear of from about 150 g/mil to about 225 g/mil.

24. The film of any of paragraphs 11 to 23, wherein the film has a Dart Impact of from about 80 g/mil to about 250 g/mil.

25. The film of any of paragraphs 11 to 24, wherein the film has a Dart Impact of from about 250 g/mil to about 450 g/mil.

EXAMPLES

Tests and Materials

The properties cited below were determined in accordance with the following test procedures. Where any of these properties is referenced in the appended claims, it is to be measured in accordance with the specified test procedure. Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

Gauge, reported in mils, was measured using a Measuretech Series 200 instrument. The instrument measures film thickness using a capacitance gauge. For each film sample, ten film thickness data points were measured per inch of film as the film was passed through the gauge in a transverse direction. From these measurements, an average gauge measurement was determined and reported.

Elmendorf tear (tear) was measured as specified by ASTM D-1922.

Tensile properties, including tensile strength, at 100% (200%, 300%, 400%, 500%, 600%, 700%, 800%, etc.) elongation, stress and strain at the primary yield point, stress and strain at the secondary yield point, 1% Secant modulus, tensile strength at yield, tensile strength at break, ultimate tensile strength, elongation at yield, elongation at break, yield stress, and strain hardening were measured as specified by ASTM D-882.

Melt Index (MI, also referred to as 12) is measured according to ASTM D1238 at 190° C., under a load of 2.16 kg unless otherwise noted. The unit for MI is g/10 min or dg/min. High Load Melt Index (HLMI, also referred to as 121) is the melt flow rate measured according to ASTM D-1238 at 190° C., under a load of 21.6 kg. The unit for HLMI is g/10 min or dg/min.

Melt index ratio (MIR) is defined as the ratio of HLMI to MI. Density was measured as specified by ASTM D-1505 using chips cut from plaques compression molded in accordance with ASTM D-4703-07, aged for 40 hrs at 23° C. plus or minus 2° C., unless specifically stated otherwise.

Dart Impact (also known as Dart F$_{50}$, or Dart Drop Impact or Dart Drop Impact Strength) was measured as specified by ASTM D-1709, method A.

Haze (both internal and total) reported as a percentage (%), was measured as specified by ASTM D1003.

Gloss, a dimensionless number, was measured as specified by ASTM D-2457 at 45°.

Melt strength is defined as the force required to draw a molten polymer extrudate at a rate of 12 mm/s$^2$ and at an extrusion temperature of 190° C. until breakage of the extrudate whereby the force is applied by take up rollers. The polymer was extruded at a velocity of 0.33 mm/s through an annular die of 2 mm diameter and 30 mm length. Melt strength values reported herein were determined using a Gottfert Rheotens tester and were reported in centi-Newtons (cN). Additional experimental parameters for determining the melt strength are listed in the table below. For the measurements of melt strength, the resins were stabilized with 500 ppm of Irganox® 1076 and 1500 ppm of Irgafos® 168.

| Melt Strength test parameters | |
| --- | --- |
| Acceleration | 12 mm/s$^2$ |
| Temperature | 190° C. |
| Piston diameter | 12 mm |

| Melt Strength test parameters | |
|---|---|
| Piston speed | 0.178 mm/s |
| Die diameter | 2 mm |
| Die length | 30 mm |
| Shear rate at the die | 40.05 s$^{-1}$ |
| Strand length | 100.0 mm |
| Vo (velocity at die exit) | 10.0 mm/s |

Peak melting point, Tm, (also referred to as melting point), peak crystallization temperature, Tc, (also referred to as crystallization temperature), glass transition temperature (Tg), heat of fusion (ΔHf or Hf), and percent crystallinity were determined using the following DSC procedure according to ASTM D3418-03. Differential scanning Calorimetric (DSC) data were obtained using a TA Instruments model Q200 machine. Samples weighing approximately 5 mg to 10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity was calculated using the formula, [area under the melting peak (Joules/gram)/B (Joules/gram)] *100, where B is the heat of fusion for the 100% crystalline homopolymer of the major monomer component. These values for B are to be obtained from the Polymer Handbook, Fourth Edition, published by John Wiley and Sons, New York 1999, provided; however, that a value of 207 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

The $^{13}$C-NMR was performed on a 10 mm broadband probe using a field of at least 400 MHz in tetrachloroethane-d2 solvent at 120° C. with a flip angle of 90° and full NOE with decoupling. Sample preparation (polymer dissolution) was performed at 140° C. where 0.20 grams of polymer was dissolved in an appropriate amount of solvent to give a final polymer solution volume of 3 ml. Chemical shifts were referenced by setting the ethylene backbone $(-CH_2-)_n$ (where n>6) signal to 29.98 ppm. Carbon NMR spectroscopy was used to measure the composition of the reactor products as submitted.

Commercially available polymer Exceed™ 1018 was used as a comparative example. Exceed™ 1018 resin is an ethylene and 1-hexene copolymer available from ExxonMobil Chemical Company. Properties of Exceed™ 1018 include: a density of 0.918 g/cm$^3$ (ASTM D1505); a melt index of 1 g/10 min (ASTM D1238; 190° C., 2.16 kg); a Peak Melting Temperature of 119° C., a Haze of 18% (ASTM D1003), and a Gloss (45°) of 39 (ASTM D2457).

EXP-605 is an ethylene and 1-hexene copolymer available from ExxonMobil Chemical Company as a commercial grade EXP-605. Properties of EXP-605 include: a density of 0.940 g/cm$^3$; a tensile strength at yield (MD) of 19.3 MPa and (TD) of 22.2 MPa; a tensile strength at break (MD) of 64.8 MPa and (TD) of 44.1 MPa; and elongation at break (MD) of 504% and (TD) of 44.1 MPa; a 1% secant modulus (MD) of 572 MPa and (TD) of 800 MPa; a Haze of 23% and a Gloss (45°) of 25; a melt index (MI) of 0.2 g/10 min; a melt index ratio (HLMI/MI) of 75. EXP-605 is also referred to "example 13" herein.

Irganox™ 1076 is an antioxidant available from Ciba Specialty Chemicals Corporation, Tarrytown, N.Y.

Irgafos 168 is an antioxidant available from Ciba Specialty Chemicals Corporation, Tarrytown, N.Y.

Ethylene-Norbornene Copolymerization.

The ethylene-norbornene copolymers were produced in a continuous stirred tank reactor system. A 1-liter autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. Isohexane was pumped into the reactors by Pulsa feed pumps. Norbornene was dissolved in toluene at a concentration of about 85 wt % and the solution was then fed into reactor using a metering pump. All flow rates of liquid were controlled using Coriolis mass flow controller (Quantim series from Brooks). Ethylene and H$_2$ flowed as a gas under its own pressure through a Brooks flow controller. Monomers (e.g., ethylene and norbornene) and H$_2$ feeds were combined into one stream and then mixed with isohexane stream. The mixture was then fed to the reactor through a single line. Scavenger solution was also added to the combined solvent and monomer stream just before it entered the reactor to further reduce any catalyst poisons. Catalyst solution was fed to the reactor using an ISCO syringe pump through a separated line.

Isohexane (used as solvent), and monomers (e.g., ethylene and norbornene) were purified over beds of alumina and molecular sieves. Toluene used for the preparation of the catalyst solutions was purified by the same technique.

An isohexane solution of tri-n-octyl aluminum (TNOA) (25 wt % in hexane, Sigma Aldrich) was used as scavenger solution. The catalyst di(p-triethylsilylphenyl) methylene (cyclopentadienyl) (3,8-di-t-butylfluorenyl)hafnium dimethyl (obtained from Albemarle Catalyst of Charlotte, N.C.) was activated with N,N-dimethyl anilinium tetrakis (pentafluorophenyl) borate at a molar ratio of about 1:1 in 900 ml of toluene.

The polymer produced in the reactor exited through a back pressure control valve that reduced the pressure to atmospheric. This caused the unconverted monomers in the solution to flash into a vapor phase which was vented from the top of a vapor liquid separator. The liquid phase, including mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields.

The detailed polymerization process conditions and some characteristic properties are listed in Table 2. The scavenger feed rate was adjusted to adjust the catalyst efficiency, and the feed rate varied from 0 (no scavenger) to 15 μmol/min. The catalyst feed rates were also adjusted according to the level of impurities in the system to reach the targeted conversions listed. All the reactions were carried out at a pressure of about 2.4 MPa/g unless otherwise mentioned.

Table 1 illustrates the NB content evaluated by $^{13}$C NMR, as well as the MI and HLMI for six ethylene-norbornene copolymers (Examples 1-6) produced using the polymerization procedure as explained above. Examples 5 and 6 had the lowest content of NB (1.7 mol %), whereas Example 2 contained no more than 4.0 mol % (12.1 wt %) of NB. Example 2 had the lowest MI value of 0.2 g/10 min, whereas Example 1 (3.7 mol % of NB) holds the highest MI (1.7 g/10 min) and HLMI (41.9 g/min).

TABLE 1

Copolymers

|  | Example 1 | Example 2 | Example 3 | Example 4 | Example 5 | Example 6 |
|---|---|---|---|---|---|---|
| NMR NB (mol %) | 3.7 | 4.0 | 2.6 | 3.0 | 1.7 | 1.7 |
| NMR NB (wt %) | 11.5 | 12.1 | 8.1 | 9.3 | 5.5 | 5.5 |
| MI (190° C., 2.16 kg) (g/10 min) | 1.7 | 0.2 | 0.8 | 0.2 | 1.5 | 0.4 |
| HLMI (190° C., 21.6 kg) (g/10 min) | 41.9 | 7.9 | 21.3 | 5.2 | 37.8 | 13.9 |

Copolymers Characterization

As shown in Table 2, of the copolymers tested, Example 6 (1.7 mol % NB) appeared to have the highest crystallinity temperature Tc (102.7° C.), as well as the highest melting temperature Tm (117.0° C.), with an ethylene content of 94.5 wt %. Example 7 (with the lowest ethylene content of 87.1 wt %) provided the lowest Tc (83.3° C.) and Tm (101.7° C.), as well as the lowest heat of fusion (93.5 J/g). Additionally, the densities of the copolymers obtained under the described condition range from 0.9285 g/cm$^3$ (Example 4) to 0.9351 g/cm$^3$ (Example 5), which indicates that the copolymers are low density copolymers.

Copolymers of Tables 1 and 2 were made into blown film under standard conditions using a blown film line as shown in Table 3. The line was equipped with a 60 mil die gap and operated with a blow up ratio (BUR) of 3:1. The films were evaluated at ExxonMobil Chemical Company, Baytown, Tex. using standard polyethylene film testing procedures.

The films were processed at a die throughput rate of from about 7 lbs/hr/die inch to about 10 lbs/hr/die inch, thus to produce monolayer films having a thickness of 0.75 mil, 1 mil and 3 mil. The temperature of the melt was from the range of 370° F. (188° C.) to 406° F. (208° C.). Performance of films made with ethylene-norbornene copolymers of the present disclosure were evaluated and reported in Table 4.

TABLE 2

|  | Example 1 | Example 2 | Example 3 | Example 4 | Example 5 | Example 6 |
|---|---|---|---|---|---|---|
| Reaction Temperature (° C.) | 130 | 130 | 130 | 130 | 130 | 130 |
| H2 feed rate (cm$^3$/min) | 8 | 5 | 8 | 5 | 10 | 7 |
| Ethylene feed rate (g/min) | 9.05 | 9.05 | 9.05 | 9.05 | 9.05 | 9.05 |
| Norbornene feed rate (g/min) | 1.595 | 1.595 | 1.259 | 1.259 | 0.84 | 0.84 |
| Catalyst feed rate (mol/min) | 2.119E−07 | 2.119E−07 | 2.001E−07 | 2.001E−07 | 2.001E−07 | 2.001E−07 |
| Isohexane feed rate (g/min) | 56.7 | 56.7 | 56.7 | 56.7 | 56.7 | 56.7 |
| Conversion (%) | 82.8 | 86.5 | 79.4 | 84.7 | 95.4 | 95.1 |
| Ethylene (wt %) | 87.4 | 88.1 | 91.9 | 90.7 | 92.3 | 94.5 |
| Tc (° C.) | 90.3 | 86.5 | 93.9 | 92.6 | 101.2 | 102.7 |
| Tm (° C.) | 105.0 | 102.8 | 110.5 | 107.8 | 116.0 | 117.0 |
| Heat of fusion (J/g) | 108.3 | 98.1 | 114.5 | 108.6 | 135.2 | 133.6 |
| MI (g/10 min) | 1.13 | 0.25 | 0.70 | 0.07 | 1.36 | 0.33 |
| HLMI (g/10 min) | 35.5 | 11.3 | — | 5.55 | 38.50 | 14.93 |
| MIR (HLMI/MI) | 31.4 | 45.7 | — | 80.26 | 28.21 | 45.11 |
| Density (g/cm$^3$) | — | 0.9308 | 0.9318 | 0.9295 | 0.9351 | — |

|  | Example 7 | Example 8 | Example 9 | Example 10 | Example 11 | Example 12 |
|---|---|---|---|---|---|---|
| Reaction Temperature (° C.) | 130 | 130 | 130 | 130 | 130 | 130 |
| H2 feed rate (cm$^3$/min) | 5 | 10 | 5 | 10 | 5 | 8 |
| Ethylene feed rate (g/min) | 9.05 | 9.05 | 9.05 | 9.05 | 9.05 | 9.05 |
| Norbornene feed rate (g/min) | 1.6836 | 1.68 | 1.523 | 1.523 | 1.595 | 1.595 |
| Catalyst feed rate (mol/min) | 2.355E−07 | 2.355E−07 | 2.355E−07 | 2.355E−07 | 2.119E−07 | 2.119E−07 |
| Isohexane feed rate (g/min) | 56.7 | 56.7 | 56.7 | 56.7 | 56.7 | 56.7 |
| Conversion (%) | 82.2 | 83.8 | 82.3 | 78.9 | 80.6 | 80.9 |
| Ethylene (wt %) | 87.1 | 87.4 | 87.9 | 90.2 | — | — |
| Tc (° C.) | 83.3 | 87.2 | 87.8 | — | 90.2 | — |
| Tm (° C.) | 101.7 | 104.6 | 104.7 | — | 106.3 | — |
| Heat of fusion (J/g) | 93.5 | 100.9 | 98.2 | — | 103.9 | — |
| MI (g/10 min) | 0.31 | 2.43 | 0.45 | 3.62 | — | 2.28 |
| HLMI (g/10 min) | — | — | — | — | 4.88 | 114.96 |
| MIR (HLMI/MI) | — | — | — | — | — | 50.42 |
| Density (g/cm$^3$) | — | — | — | — | — | — |

TABLE 3

| Copolymer | MI (g/10 min) | MIR | NB (mol %) | Screw Speed (rpm) | Production Rate (lbs/hr) | Time for rate check (min) | Gauge (mil) |
|---|---|---|---|---|---|---|---|
| Exceed ™ 1018 (Sample 1) | 1 | 19 | N/A | 75 | 57 | 5 | |
| | | | | 76 | 58 | 5 | |
| | | | | 78 | 60 | 5 | 3 |
| | | | | | | | 1 |
| Example 5 | 1.5 | 26 | 1.7 | 75 | | | 3 |
| | | | | | | | 0.75 |
| Example 3 | 0.8 | 28 | 2.6 | | | | 3 |
| | | | | Data not obtained | | | |
| Example 1 | 1.7 | 24 | 3.7 | | | | 3 mil |
| Example 13 | 0.2 | 75 | N/A | 75 | 47 | 1 | |
| EXP-605 | | | | 80 | 51 | 1 | |
| | | | | 85 | 55 | | |
| | | | | 90 | 58 | | 3 |
| | | | | 90 | | | |
| Example 6A | 0.4 | 34 | 17 | 90 | | | 3 |
| | | | | | | | increased line |
| Example 6B | | | | 90 | 62 | 1 | 3 |
| | | | | | | | increased line speed |
| Example 4 | 0.2 | 32 | 3.0 | 90 | Data not obtained | | |
| Example 14 | 0.2 | 39 | 4.0 | 90 | Data not obtained | | |

| Copolymer | Die (° F.) Upper | Die (° F.) Lower | Extruder (° F.) 3 | Extruder (° F.) 2 | Extruder (° F.) 1 |
|---|---|---|---|---|---|
| | | | Set Points | | |
| | 338 | 355 | 355 | 355 | 355 |
| | | | Present Value | | |
| Exceed ™ 1018 | 355 | 355 | 355 | 368 | 356 |
| | 337 | 355 | 355 | 370 | 356 |
| | 338 | 355 | 355 | 372 | 352 |
| Example 5 | 332 | 355 | 355 | 357 | 351 |
| | 330 | 355 | 355 | 359 | 355 |
| Example 3 | 332 | 355 | 355 | 360 | 357 |
| Example 1 | 334 | 355 | 355 | 360 | 355 |
| | | | Set Points | | |
| | 328 | 355 | 355 | 355 | 352 |
| | | | Present Value | | |
| Example 13 | 326 | 355 | 348 | 359 | 351 |
| EXP-605 | 326 | 355 | 350 | 361 | 351 |
| | 327 | 355 | 350 | 369 | 349 |
| | 329 | 355 | 350 | 373 | 349 |
| | 330 | 355 | 350 | 375 | 348 |
| Example 6A | 330 | 355 | 350 | 374 | 374 |
| | 332 | 356 | 350 | 389 | 352 |
| Example 6B | 335 | 357 | 350 | 394 | 352 |

| Copolymer | Feed (° F.) | Melt (° F.) | Pressure (kpsi) | Frost Line Height (inches) |
|---|---|---|---|---|
| | 340 | | | |
| Exceed ™ 1018 | 340 | 384 | 3.5 | 11 to 12 |
| | 340 | 387 | 3.4 | 11 to 12 |
| | 340 | 383 | | 11 to 12 |
| Example 5 | 340 | 370 | | 10 |
| | 339 | 377 | | 10 |
| Example 3 | 341 | 377 | 3.7 | 18 |
| Example 1 | 340 | 373 | 3 | |
| | 340 | | | |
| Example 13 | 341 | 375 | 3.6 | |
| EXP-605 | 341 | 378 | 3.7 | |
| | 340 | 385 | 3.7 | |
| | 340 | 389 | 3.4 | |
| | 340 | 390 | | |
| Example 6A | 342 | 391 | | 15 |
| | 345 | 403 | 4.2 | |
| Example 6B | 341 | 406 | 3.8 | 17 |

The films were tested and the film properties were reported in Table 4. Blown films made from ethylene-norbornene copolymers offer superior stiffness with exceptional optical properties when compared to Exceed™ 1018 and EXP-605 (Example 13). Furthermore, the films exhibit an impact resistance (dart drop) and a clarity that was similar or superior to that of 100 wt % Exceed™ 1018 and EXP-605 (Example 13) films, as shown in Table 4. The films provided a good balance of stiffness versus toughness as indicated by machine direction tear strength (MD Elmendorf Tear), 1% Secant Modulus (MD), and dart drop impact strength performance (Dart Impact) with improved optical properties. Copolymers of Example 5a demonstrated superior clarity (Haze of 7.8%).

The films made from the ethylene-norbornene copolymers had desirable processability superior to that of Exceed™ 1018 and EXP-605 (Example 13). The films also demonstrated superior bubble stability, superior MD tear resistance, and superior impact resistance when compared to Exceed™ 1018 and EXP-605 (Example 13).

Furthermore, the impact resistance of the films increased with increasing MD tear resistance for in-reactor resins.

TABLE 4

|  | Exceed™ 1018 | Example 13 | Example 5a | Example 6a | Example 6b | Example 3 |
|---|---|---|---|---|---|---|
| Copolymers |  |  |  |  |  |  |
| MI (g/10 min) | 1 | — | 1.5 | 0.4 | 0.4 | 0.8 |
| NB (mol %) | — | — | 1.7 | 1.7 | 1.7 | 2.6 |
| Gauge Mic (mils) |  |  |  |  |  |  |
| Average | 2.9 | 3.2 | 3.0 | 3.4 | 3.3 | 3.3 |
| Cv | 4 | 10 | 6 | 14 | 13 | 8 |
| 1% Secant (psi) |  |  |  |  |  |  |
| MD | 26,537 | 65,123 | 47,470 | 37,602 | 36,710 | 22,491 |
| TD | 28,657 | 76,207 | 50,296 | 41,449 | 38,706 | 26,570 |
| Tensile Yield Strength (psi) |  |  |  |  |  |  |
| MD | 1,590 | 2,858 | 1,956 | 2,370 | 2,108 | 1,901 |
| TD | 1,580 | 2,850 | 2,146 | 2,006 | 1,960 | 1,653 |
| Elmendorf Tear |  |  |  |  |  |  |
| MD (g/mil) | 317 | 42 | 92 | 152 | 153 | 219 |
| TD (g/mil) | 414 | 152 | 296 | 287 | 322 | 362 |
| Average | 1060 | 301 | 573 | 731 | 776 | 907 |
| TD/MD | 1.3 | 3.1 | 3.3 | 2.0 | 2.4 | 1.6 |
| Dart Drop |  |  |  |  |  |  |
| Phenolic Method A (g/mil) | ≥475 | 81 | 108 | 160 | 164 | ≥425 |
| Stainless Method B (g/mil) | 327 | <105 | <112 | ≤110 | ≤111 | 278 |
| Puncture |  |  |  |  |  |  |
| Maximum Force (lbs/mil) | 7.15 | 7.09 | 7.71 | 6.47 | 7.45 | 6.04 |
| Break Energy/mil (in-lbs/mil) | 18.83 | 9.16 | 16.57 | 13.21 | 16.03 | 13.36 |
| Shrink (%) |  |  |  |  |  |  |
| MD | 80 | 32 | 52 | 35 | 34 | 39 |
| TD | 98 | 73 | 96 | 77 | 81 | 86 |
| Haze (%) | 20.1 | 22.4 | 7.8 | 13.1 | 10.6 | 3.5 |
| Internal (%) | 8.91 | 5.45 | 5.86 | 3.96 | 3.95 | 1.89 |
| Gloss 45° (GU) |  |  |  |  |  |  |
| MD | 13 | 9 | 23 | 16 | 17 | 24 |
| TD | 13 | 9 | 23 | 16 | 18 | 24 |

|  | Exceed™ 1018 | Example 5b | Example 5c | Example 5d |
|---|---|---|---|---|
| Copolymer |  |  |  |  |
| MI (g/10 min) | 1 | 1.5 | 1.5 | 1.5 |
| NB (mol %) |  | 1.7 | 1.7 | 1.7 |
| Gauge Mic (mils) |  |  |  |  |
| Average |  | 1.0 | 1.1 | 0.74 | 0.49 |
| Cv |  | 7 | 7 | 8 | 8 |

TABLE 4-continued

| 1% Secant (psi) | | | | |
|---|---|---|---|---|
| MD | 25,522 | 45,892 | 40,320 | 44,565 |
| TD | 27,356 | 51,630 | 46,035 | 56,882 |
| Tensile Yield Strength (psi) | | | | |
| MD | 1,532 | 1,981 | 2,014 | 2,060 |
| TD | 1,472 | 2,203 | 2,222 | 2,426 |
| Elmendorf Tear | | | | |
| MD (g/mil) | 247 | 49 | 28 | 29 |
| TD (g/mil) | 436 | 395 | 669 | 1080 |
| Average | 332 | 241 | 367 | 277 |
| TD/MD | 1.7 | 8.3 | 25.7 | 40.6 |
| Dart Drop | | | | |
| Phenolic Method A (g/mil) | 620 | 103 | 88 | <127 |
| Stainless Method B (g/mil) | 416 | <314 | <454 | <686 |
| Puncture | | | | |
| Maximum Force (lbs/mil) | 9.11 | 9.25 | 9.57 | 10.59 |
| Break Energy/mil (in-lbs/mil) | 24.62 | 18.63 | 19.54 | 19.33 |
| Shrink (%) | | | | |
| MD | 60 | 38 | 38 | 36 |
| TD | 98 | −5 | −2 | −7 |
| Haze (%) | 16.6 | 6.0 | 6.4 | 7.9 |
| Internal (%) | 1.86 | 2.32 | 1.74 | 1.42 |
| Gloss 45° (GU) | | | | |
| MD | 8 | 20 | 20 | 18 |
| TD | 10 | 20 | 20 | 18 |

Table 5 illustrates some films properties. The blown films were found to be anisotropic. The blown films were compression molded in order to relax the stress in the film, thus forming a stress free sample. The stress free samples were then evaluated accordingly and illustrated in Table 6.

TABLE 5

| Tensile | Example 14 | Example 15 | Example 16 | Example 17 | Example 18 | Example 19 | Example 20 |
|---|---|---|---|---|---|---|---|
| Yield Strength(psi) | 1,352 | 1,118 | 1,668 | 2,330 | 1,376 | 2,269 | 2,163 |
| Elongation at Yield (%) | 5.7 | 6.1 | 6.9 | 5.5 | 6.0 | 5.6 | 5.7 |
| Tensile Strength (psi) | 5,040 | 6,063 | 5,706 | 2,676 | 6,159 | 4,906 | 4,832 |
| Elongation at Break (%) | 515 | 520 | 582 | 192 | 580 | 581 | 596 |
| Intrinsic Tear (g) | 1,261 | 1,423 | 1,076 | 269 | 1,192 | 1,046 | 864 |

Capillary Rheometry

Figure 1B:
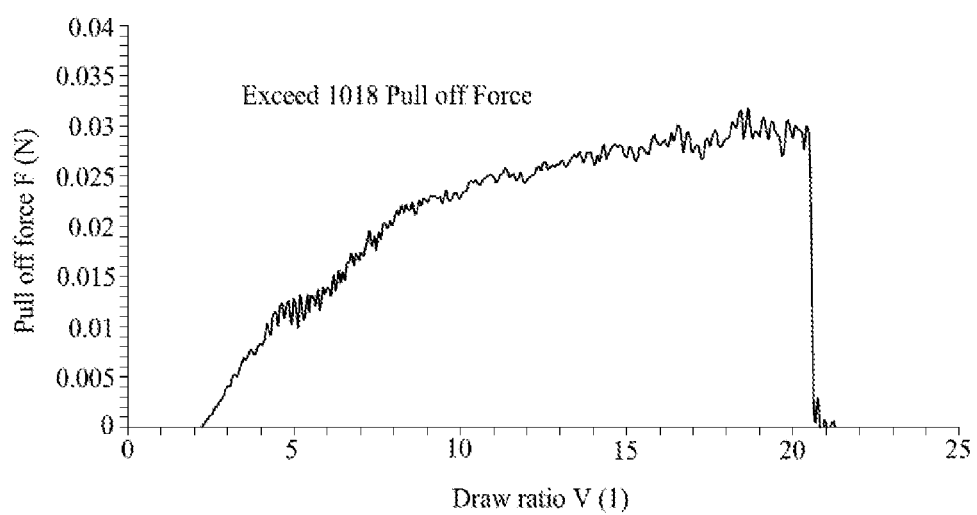
FIG. 1B is a graph illustrating extensional viscosity plot of pull-off force (melt strength) as a function of draw ratio of a comparative Exceed 1018, according to one embodiment.
Figure 2A:
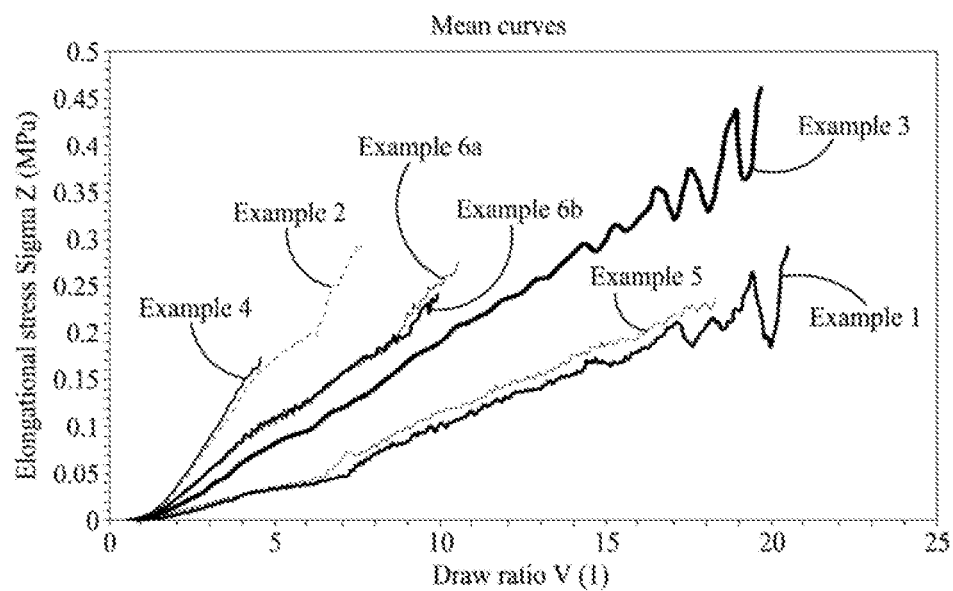
FIG. 2A is a graph illustrating elongational viscosity of films having a cyclic olefin copolymer, according to one embodiment.
Figure 2B:
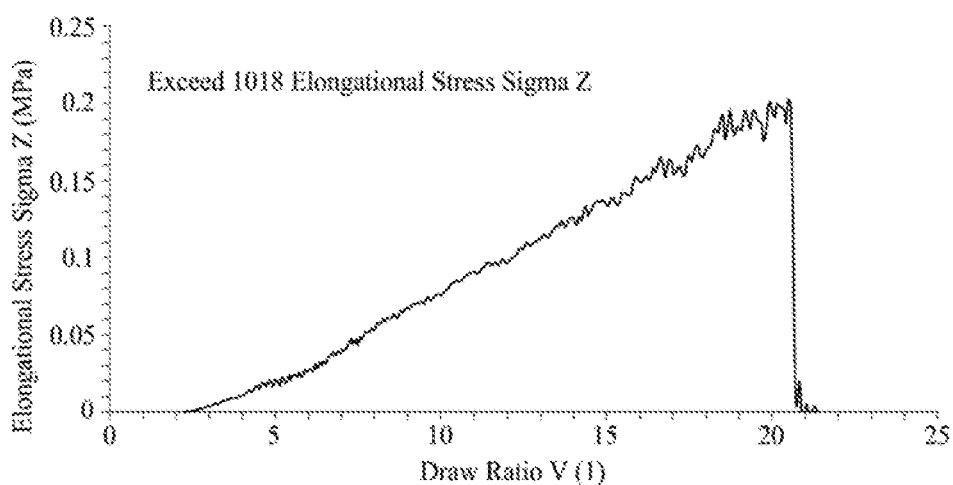
FIG. 2B is a graph illustrating elongational viscosity of a comparative Exceed 1018, according to one embodiment.

FIG. 1A is a graph illustrating an extensional viscosity plot of pull-off force (melt strength) as a function of draw ratio of the cyclic olefin copolymer compositions. FIG. 2A is a graph illustrating a comparison of the elongational viscosity of the cyclic olefin copolymer compositions. FIGS. 1A and 2A show that the ethylene-norbornene copolymers of Example 2 (4 mol % NB) has a melt strength and elongational viscosity greater than those of Examples 6a, 6b, 3, 5 and 1, but less than that of Example 4 (3 mol % NB). Melt strength and elongational viscosity did not appear to be directly proportional to the concentration of norbornene contained in the copolymers. FIG. 1B is a graph illustrating an extensional viscosity plot of pull-off force (melt strength) as a function of draw ratio of Exceed 1018, and FIG. 2B is a graph illustrating the elongational viscosity of Exceed 1018. FIGS. 1B and 2B show that Examples 1 and 5 present comparable melt strengths and elongational viscosity as compared to the melt strength and elongational viscosity of Exceed 1018.

Figure 3A:
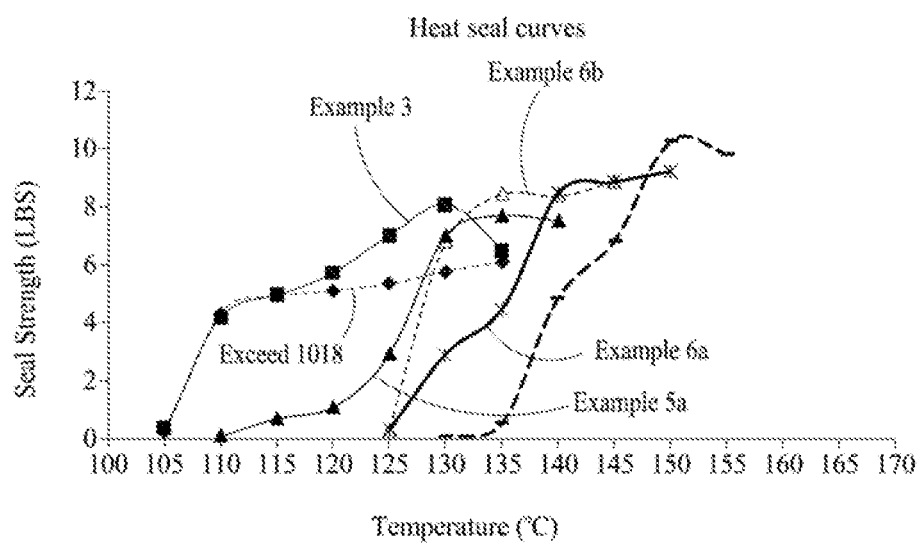
FIG. 3A is a graph illustrating heat seal performance of films prepared with cyclic olefin copolymers and comparative copolymers, according to one embodiment.
Figure 3B:
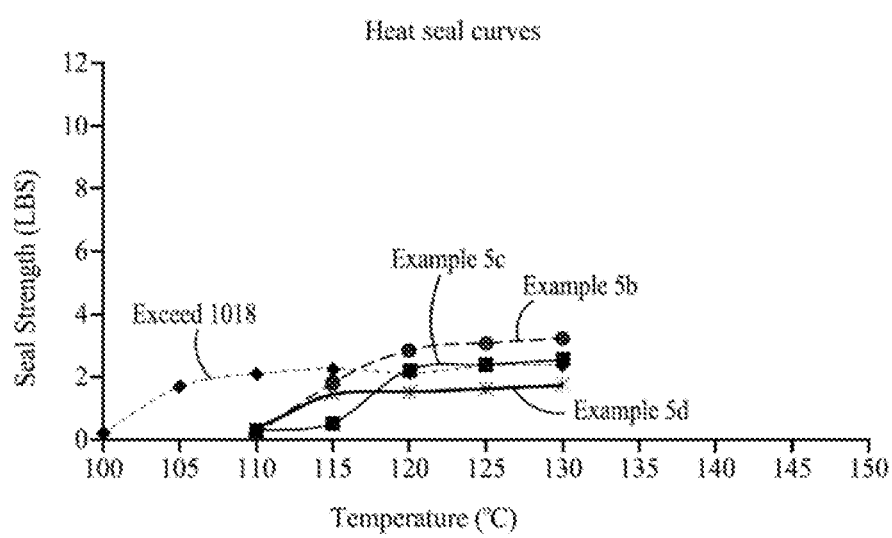
FIG. 3B is a graph illustrating heat seal performance of films prepared with cyclic olefin copolymers and comparative copolymers, according to one embodiment.

FIGS. 3A and 3B are graphs illustrating a comparison of the heat seal performance of cyclic olefin copolymers to a comparative copolymer, Exceed™ 1018. All data points are reported in Table 6 (P=Peel; B=Break; T=Tear) with seal conditions as follows:
 Sealed I/I
 Seal Pressure=73 psi
 Seal Time=1 sec
 Peel Speed=20 in/min The films exhibited improved heat seal performance and hot tack performance when compared with films made from 100 wt % Exceed™ 1018 and EXP-605 (FIGS. 3A, 3B, 4A, and 4B). Cyclic olefin copolymers produced heat-seal films having similar or lower seal initiation temperatures and improved hot-tack performance when compared to EXP-605. As discussed above, the compression molded samples of the films were obtained and the results depicted in Table 6. The compression molded films were found to be isotropic. Example 3 exhibits similar heat seal performance and improved hot tack performance as compared to films made from 100 wt % of Exceed™ 1018 (FIGS. 3A and 4A; Table 6).

TABLE 6

| Temperature (° C.) | Example 3 0.8 MI, 2.7 mol % NB 3 mil | | Example 6a 0.4 MI, 1.7 mol % NB 3 mil | | Example 6b 0.4 MI, 1.7 mol % NB 3 mil | | Example 5a 1.5 MI, 1.7 mol % NB 3 mil | | Exceed™ 1018 3 mil | | Example 13 3 mil | |
|---|---|---|---|---|---|---|---|---|---|---|---|---|
| 100 | | | | | | | | | | | | |
| 105 | 0.35 | P | | | | | | | 0.19 | P | | |
| 110 | 4.19 | P | | | | | 0.11 | P | 4.32 | P | | |
| 115 | 4.95 | P | | | | | 0.70 | P | 4.93 | P | | |
| 120 | 5.74 | P | | | | | 1.09 | P | 5.09 | P | | |
| 125 | 7.02 | B | 0.31 | P | 0.37 | P | 2.90 | P | 5.35 | B | | |
| 130 | 8.06 | B | 2.89 | P | 6.77 | P | 7.00 | B | 5.77 | B | 0.09 | P |
| 135 | 6.52 | B | 4.48 | P | 8.40 | B | 7.68 | B | 6.09 | B | 0.56 | P |
| 140 | | | 8.45 | B | 8.34 | B | 7.51 | B | | | 4.86 | P |
| 145 | | | 8.85 | B | 8.87 | B | | | | | 6.83 | B |
| 150 | | | 9.20 | B | | | | | | | 10.25 | B |
| 155 | | | | | | | | | | | 9.80 | B |

| Temperature (° C.) | Exceed™ 1018 1 mil Exceed™ 1018 | | Example 5b 1.5 MI, 1.7 mol % NB 1.1 mil | | Example 5c 1.5 MI, 1.7 mol % NB 0.74 mil | | Example 5d 1.5 MI, 1.7 mol % NB 0.49 mil | |
|---|---|---|---|---|---|---|---|---|
| 100 | | | | | | | | |
| 105 | 0.16 | P | | | | | | |
| 110 | 1.67 | P | | | | | | |
| 110 | 2.07 | P | 0.11 | P | 0.24 | P | 0.27 | P |
| 115 | 2.22 | P | 1.79 | P | 0.51 | P | 1.42 | P |
| 120 | 2.10 | B | 2.83 | B | 2.19 | P | 1.49 | B |
| 125 | 2.32 | B | 3.06 | B | 2.36 | B | 1.58 | B |
| 130 | 2.35 | B | 3.22 | B | 2.51 | B | 1.68 | B |
| 135 | | | | | 2.36 | B | | |

Figure 4A:
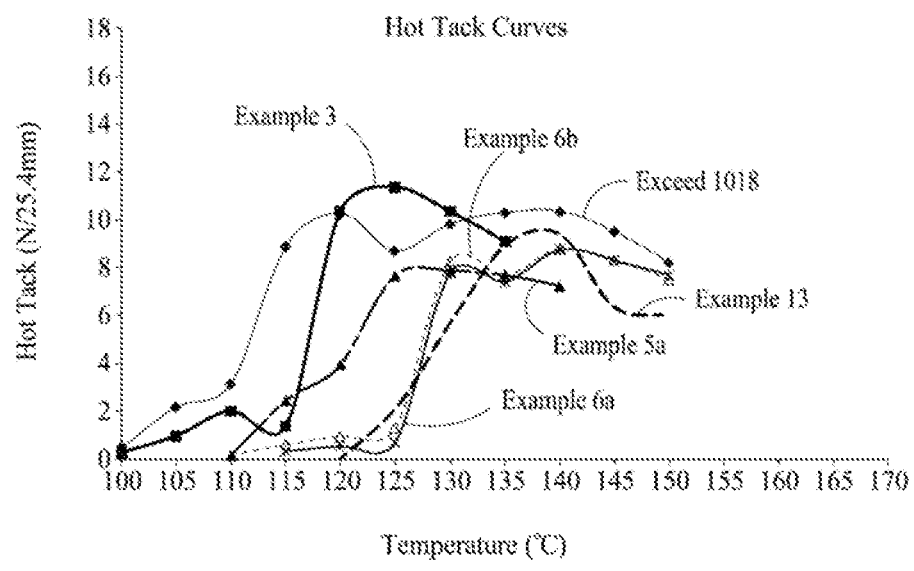
FIG. 4A is a graph illustrating hot tack performance of films prepared with cyclic olefin copolymers and comparative copolymers, according to one embodiment.
Figure 4B:
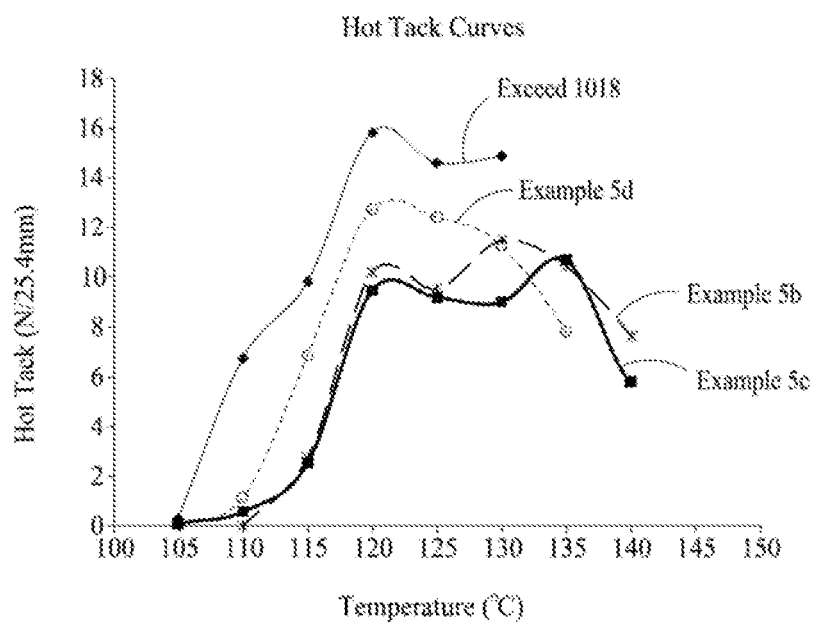
FIG. 4B is a graph illustrating hot tack performance of films prepared with cyclic olefin copolymers and comparative copolymers, according to one embodiment.

FIGS. 4A and 4B are graphs illustrating a comparison of the hot tack performance of cyclic olefin copolymers to comparative commercial polymer, Exceed™ 1018. All data points are reported in Table 7 with seal conditions as follows:

Sealed I/I
Seal Pressure=0.5 N/mm$^2$
Seal Time=0.5 sec
Dwell Time=0.4 sec
Peel Speed=200 mm/sec
Backed with 2.5 mil 3M/854—Polyester Film Tape

TABLE 7

| Temperature (° C.) | Example 3 0.8 MI, 2.7 mol % NB | Example 6a 0.4 MI, 1.7 mol % NB | Example 6b 0.4 MI, 1.7 mol % NB | Example 7 1.5 MI, 1.7 mol % NB | Exceed™ 1018 | Example 13 |
|---|---|---|---|---|---|---|
| 100 | 0.27 | | | | 0.45 | |
| 105 | 0.97 | | | | 2.17 | |
| 110 | 2.01 | | 0.17 | 0.13 | 3.13 | |
| 115 | 1.35 | 0.33 | 0.58 | 2.41 | 8.85 | |
| 120 | 10.34 | 0.53 | 0.94 | 3.93 | 10.23 | 0.03 |
| 125 | 11.34 | 0.69 | 1.28 | 7.64 | 8.69 | 2.08 |
| 130 | 10.32 | 7.75 | 8.24 | 7.86 | 9.82 | 5.61 |
| 135 | 9.08 | 7.42 | 7.64 | 7.65 | 10.28 | 8.88 |
| 140 | | 8.70 | 8.76 | 7.24 | 10.34 | 9.36 |
| 145 | | 8.27 | 8.30 | | 9.48 | 6.31 |
| 150 | | 7.67 | 7.49 | | 8.22 | 5.95 |

| Temperature (° C.) | Exceed™ 1018 1 mil | Example 5b 1.1 mil | Example 5c 0.75 mil | Example 5d 0.49 mil |
|---|---|---|---|---|
| 105 | 0.32 | | 0.15 | 0.07 |
| 110 | 6.79 | 0.08 | 0.60 | 1.16 |
| 115 | 9.84 | 2.78 | 2.54 | 6.86 |
| 120 | 15.83 | 10.17 | 9.48 | 12.73 |
| 125 | 14.61 | 9.57 | 9.20 | 12.41 |
| 130 | 14.87 | 11.42 | 9.02 | 11.27 |
| 135 | | 10.44 | 10.66 | 7.84 |
| 140 | | 7.66 | 5.82 | |
| 145 | | | 6.17 | |

The films were evaluated for their uniformity and clarity using standard photographic techniques. A 3 mil Exceed™ 1018 film with a Haze of 20.1% was compared to a 3 mil ethylene-norbornene copolymer-based film (Example 5) with a Haze of 7.8% via Full Field Birefringence Image Analysis. Images showed the exceptional clarity of the ethylene-norbornene copolymer-based film (Example 5a) containing only 1.7 mol % of NB.

Overall, cyclic olefin copolymers and methods of the present disclosure provide films having high optical clarity and superior melt strength, amenable to form commercially viable blown films. Films made from the low density cyclic olefin copolymers demonstrate excellent physical properties such as excellent tear performance, dart impact, good balance of stiffness, shrink and outstanding optical properties.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A copolymer comprising:
    a $C_2$-$C_{40}$ monomer content of from about 75 wt % to about 99.5 wt %; and
    a $C_5$-$C_{40}$ cyclic olefin comonomer content of from about 0.5 wt % to about 25 wt %;
    wherein the copolymer has a density of about 0.91 g/cm$^3$ to about 0.933 g/cm$^3$, and the copolymer has a melt strength of from about 7 cN to about 14 cN.

2. The copolymer of claim 1, wherein the $C_2$-$C_{40}$ monomer is ethylene.

3. The copolymer of claim 1, wherein the $C_5$-$C_{40}$ cyclic olefin comonomer is selected from one or more of dicyclopentadiene, cyclopentene, cycloheptene, cyclooctene, cyclooctadiene, cyclododecene, 7-oxanorbornene, 7-oxanorbornadiene, 1-hydroxy-4-cyclooctene, 1-acetoxy-4-cyclooctene, 5-methylcyclopentene, norbornene, and norbornadiene.

4. The copolymer of claim 3, wherein the $C_5$-$C_{40}$ cyclic olefin comonomer is norbornene.

5. The copolymer of claim 1, wherein the $C_5$-$C_{40}$ cyclic olefin comonomer content is from about 9 wt % to about 15 wt %.

6. The copolymer of claim 1, wherein the copolymer has a density about 0.92 g/cm$^3$ to about 0.933 g/cm$^3$.

7. The copolymer of claim 1, wherein the copolymer has a melt strength of from about 10 cN to about 14 cN.

8. The copolymer of claim 1, wherein the copolymer has a melt index ratio of from about 25 to about 70.

9. The copolymer of claim 8, wherein the copolymer has a melt index ratio of from about 28 to about 55.

10. A film comprising the copolymer of claim 1.

11. The film of claim 10, wherein the film has a thickness of from about 1 mil to about 20 mils.

12. The film of any of claim 10, wherein the film has a total haze of about 1% to about 25%.

13. The film of claim 12, wherein the film has a total haze of about 3% to about 10%.

14. The film of claim 10, wherein the film has an internal haze of from about 1% to about 10%.

15. The film of claim 14, wherein the film has an internal haze of from about 1% to about 6%.

16. The film of claim 10, wherein the film has a 1% Secant Modulus MD of from about 20,000 psi to about 75,000 psi.

17. The film of claim 10, wherein the film has a hot tack strength of from about 2 (N/25.4 mm) to about 18 (N/25.4 mm) at a temperature of 125° C.

18. The film of claim 17, wherein the film has a hot tack strength of from about 10 (N/25.4 mm) to about 13 (N/25.4 mm) at a temperature of 125° C.

19. The film of any of claim 10, wherein the film has a heat seal strength of from about 2 lbs/in$^2$ to about 12 lbs/in$^2$ at a seal bar temperature of 130° C.

20. The film of claim 19, wherein the film has a heat seal strength of from about 6 lbs/in$^2$ to about 9 lbs/in$^2$ at a seal bar temperature of 130° C.

21. The film of claim 10, wherein the film has an MD Elmendorf Tear of from about 20 g/mil to about 150 g/mil.

22. The film of claim 10, wherein the film has an MD Elmendorf Tear of from about 150 g/mil to about 225 g/mil.

23. The film of claim 10, wherein the film has a Dart Impact of from about 80 g/mil to about 250 g/mil.

24. The film of claim 10, wherein the film has a Dart Impact of from about 250 g/mil to about 450 g/mil.

* * * * *